United States Patent
Yang et al.

(10) Patent No.: US 11,179,637 B2
(45) Date of Patent: Nov. 23, 2021

(54) ITEM DISPLAY METHOD AND APPARATUS IN VIRTUAL SCENE, AND STORAGE MEDIUM

(71) Applicant: Tencent Technology (Shenzhen) Company Limited, Shenzhen (CN)

(72) Inventors: Jin Yang, Shenzhen (CN); Yiqing Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/900,699

(22) Filed: Jun. 12, 2020

(65) Prior Publication Data
US 2020/0298123 A1 Sep. 24, 2020

Related U.S. Application Data

(63) Continuation of application No. PCT/CN2019/075036, filed on Feb. 14, 2019.

(30) Foreign Application Priority Data

Apr. 16, 2018 (CN) .......................... 201810339229.6

(51) Int. Cl.
*A63F 13/58* (2014.01)
*A63F 13/533* (2014.01)
(Continued)

(52) U.S. Cl.
CPC ............ *A63F 13/58* (2014.09); *A63F 13/533* (2014.09); *A63F 13/5372* (2014.09); *A63F 13/5375* (2014.09); *A63F 13/837* (2014.09)

(58) Field of Classification Search
CPC .... A63F 13/58; A63F 13/533; A63F 13/5372; A63F 13/837; A63F 13/35; A63F 13/5375
See application file for complete search history.

(56) References Cited

U.S. PATENT DOCUMENTS 10,252,158 B1 * 4/2019 Carnahan ................. A63F 13/69
2010/0273544 A1 10/2010 Koganezawa et al.
2018/0207522 A1 * 7/2018 Roman ............... A63F 13/2145

FOREIGN PATENT DOCUMENTS

CN 104469423 A 3/2015
CN 105159526 A 12/2015
(Continued)

OTHER PUBLICATIONS

Harven's Potions Alert, www.esoui.com. Online. Mar. 2, 2016. Accessed via the Internet. Accessed Jul. 1, 2021. <URL: https://web.archive.org/web/20160302203654/https://www.esoui.com/downloads/info562-HarvensPotionsAlert.html> (Year: 2016).*
(Continued)

*Primary Examiner* — Thomas J Hong
*Assistant Examiner* — Carl V Larsen
(74) *Attorney, Agent, or Firm* — Morgan, Lewis & Bockius LLP

(57) ABSTRACT

The present disclosure discloses an item display method performed at a terminal. The method includes: controlling, by the terminal in response to a first target operation instruction generated by a user of the terminal, a virtual control object in a virtual scene displayed by a client running at the terminal to acquire a plurality of virtual items, each virtual item configured to increase an attribute value of the virtual control object; adjusting, by the terminal, the attribute value of the virtual control object according to current behavior of the virtual control object; and displaying, by the terminal in the virtual scene of the client, an identifier of a first virtual item matching a target condition in the plurality of virtual items in a case that the adjusted attribute value meets the target condition, the identifier of the first virtual item being configured for use in the virtual scene.

18 Claims, 7 Drawing Sheets

(51) Int. Cl.
   *A63F 13/5372* (2014.01)
   *A63F 13/837* (2014.01)
   *A63F 13/5375* (2014.01)

(56) References Cited

FOREIGN PATENT DOCUMENTS

| | | |
|---|---|---|
| CN | 105935495 A | 9/2016 |
| CN | 106512405 A | 3/2017 |
| CN | 106779933 A | 5/2017 |
| CN | 108579090 A | 9/2018 |

OTHER PUBLICATIONS

Auto Potions. forums.elderscrollsonline.com. Online. Mar. 2016. Accessed via the Internet. Accessed Jul. 1, 2021. <URL: https://forums.elderscrollsonline.com/en/discussion/249400/auto-potions> (Year: 2016).*

The Elder Scrolls Online. Wikipedia.org. Online. Dec. 20, 2016. Accessed via the Internet. Accessed Jul. 1, 2021. <URL: https://en.wikipedia.org/w/index.php?title=The_Elder_Scrolls_Online&oldid=755854260> (Year: 2016).*

"Quick heal" hotkey reworked. Reddit.com. Online. Nov. 7, 2014. Accessed via the Internet. Accessed Jul. 1, 2021. <URL: https://www.reddit.com/r/Terraria/comments/2lk4nh/quick_heal_hotkey_reworked_now_uses_the_most/> (Year: 2014).*

Recovery Potions. Terraria.fandom.com. Online. Sep. 24, 2015. Accessed via the Internet. Accessed Jul. 1, 2021. <URL: https://terraria.fandom.com/wiki/Recovery_potions?oldid=538587> (Year: 2015).*

Tactics(Origins). dragonage.fandom.com. Online. Accessed via the Internet. Accessed Jul. 2, 2021. <URL: https://dragonage.fandom.com/wiki/Tactics_(Origins)> (Year: 2009).*

Dragon Age: Origins, wikipedia.org. Online. Accessed via the Internet. Accessed Jul. 2, 2021. <URL: https://en.wikipedia.org/wiki/Dragon_Age:_Origins> (Year: 2009).*

Tencent Technology, WO, PCT/CN2019/075036, Apr. 30, 2019, 4 pgs.

Tencent Technology, IPRP, PCT/CN2019/075036, Oct. 20, 2020, 5 pgs.

Tencent Technology, ISR, PCT/CN2019/075036, Apr. 30, 2019, 2 pgs.

Jilfu111, Game post, "Commoner Legend Bar", Mar. 21, 2018, Retrieved from the Internet: https://tieba.baidu.com/p/5608494833.

* cited by examiner

ITEM DISPLAY METHOD AND APPARATUS IN VIRTUAL SCENE, AND STORAGE MEDIUM

CROSS REFERENCE TO RELATED APPLICATIONS

This application is a continuation application of PCT Patent Application No. PCT/CN2019/075036, entitled "METHOD FOR DISPLAYING OBJECT IN VIRTUAL SCENE, DEVICE, AND STORAGE MEDIUM" filed on Feb. 14, 2019, which claims priority to Chinese Patent Application No. 201810339229.6, entitled "ITEM DISPLAY METHOD AND APPARATUS IN VIRTUAL SCENE, AND STORAGE MEDIUM" filed Apr. 16, 2018, all of which are incorporated by reference in their entirety.

FIELD OF THE TECHNOLOGY

Embodiments of the present disclosure relate to the field of computers, and in particular, to an item display method and apparatus in a virtual scene, and a storage medium.

BACKGROUND OF THE DISCLOSURE

At present, for a virtual item in a virtual scene, a game application usually does not have any virtual item recommendation and sorting functions. When there are many types of virtual items picked up by a gamer, a lengthy list of virtual items undoubtedly causes huge trouble for the gamer to choose, causing low efficiency of displaying the virtual item. In this way, the gamer needs to adjust a position of the virtual item in the list of virtual items in real time, find and use the required virtual item from a plurality of virtual items, to cope with a complex game scene. In this way, the gamer may pay huge operating costs, and may even be out of position in the battle, thereby delaying the opportunity for combat, and further causing the loss of the gamer.

For the problem of low efficiency of displaying items, no effective solution has been proposed yet.

SUMMARY

Embodiments of the present disclosure provide an item display method and apparatus in a virtual scene, and a storage medium, to resolve at least the technical problem of low efficiency of displaying items in the related art.

According to an aspect of the embodiments of the present disclosure, an item display method in a virtual scene is provided. The method includes: controlling, by a terminal in response to a first target operation instruction generated by a user of the terminal, a virtual control object in a virtual scene displayed by a client running at the terminal to acquire a plurality of virtual items, each virtual item being configured to increase an attribute value of the virtual control object; adjusting, by the terminal, the attribute value of the virtual control object according to current behavior of the virtual control object in the virtual scene; and displaying, by the terminal in the virtual scene of the client, an identifier of a first virtual item matching a target condition in the plurality of virtual items in a case that the adjusted attribute value meets the target condition, the identifier of the first virtual item being configured for use in the virtual scene.

According to another aspect of the embodiments of the present disclosure, a non-transitory computer readable storage medium is further provided. The storage medium stores a plurality of computer programs, the computer programs, when being executed by a terminal, cause the terminal to perform the item display method in the virtual scene according to the embodiment of the present disclosure.

According to another aspect of the embodiments of the present disclosure, a terminal is further provided. The terminal includes a memory and a processor, the memory storing a plurality of computer programs, and the processor being configured to run the computer programs to perform the item display method in a virtual scene according to the embodiment of the present disclosure.

In the embodiment of the present disclosure, the terminal controls, in response to the first target operation instruction generated by the first target operation, the virtual control object in the virtual scene displayed by the client to acquire the plurality of virtual items, the virtual item being configured to increase an attribute value of the virtual control object. The terminal adjusts the attribute value of the virtual control object according to behavior of the virtual control object in the virtual scene. The terminal displays, in the virtual scene of the client, an identifier of the first virtual item matching a target condition in the plurality of virtual items in a case that the adjusted attribute value meets the target condition, the identifier of the first virtual item being for being selected for use in the virtual scene. In other words, the first virtual item matching the target condition satisfied by the adjusted attribute value is automatically selected, according to the adjusted attribute value of the virtual control object, from the plurality of virtual items that have been acquired by the virtual control object, so that the first virtual item is displayed in the virtual scene, and a gamer does not need to adjust the virtual items in the item list in real time, finds and uses the required virtual items from a plurality of virtual items, thereby achieving the purpose of intelligently recommending virtual items in the virtual scene, so that the first virtual item that matches the adjusted attribute value of the virtual control object can be quickly and accurately located, and the technical effect of improving the efficiency of displaying the item is achieved, thereby resolving the technical problem of low efficiency of displaying the item in the related art.

BRIEF DESCRIPTION OF THE DRAWINGS

Accompanying drawings described herein are used to provide further understanding about the embodiments of the present disclosure, and constitute one portion of this application; and schematic embodiments of the present disclosure and their description are used to explain the present disclosure, and do not constitute an inappropriate limit on the present disclosure. In the accompanying drawings.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

According to an aspect of the embodiments of the present disclosure, an embodiment of an item display method in a virtual scene is provided.

Figure 1:
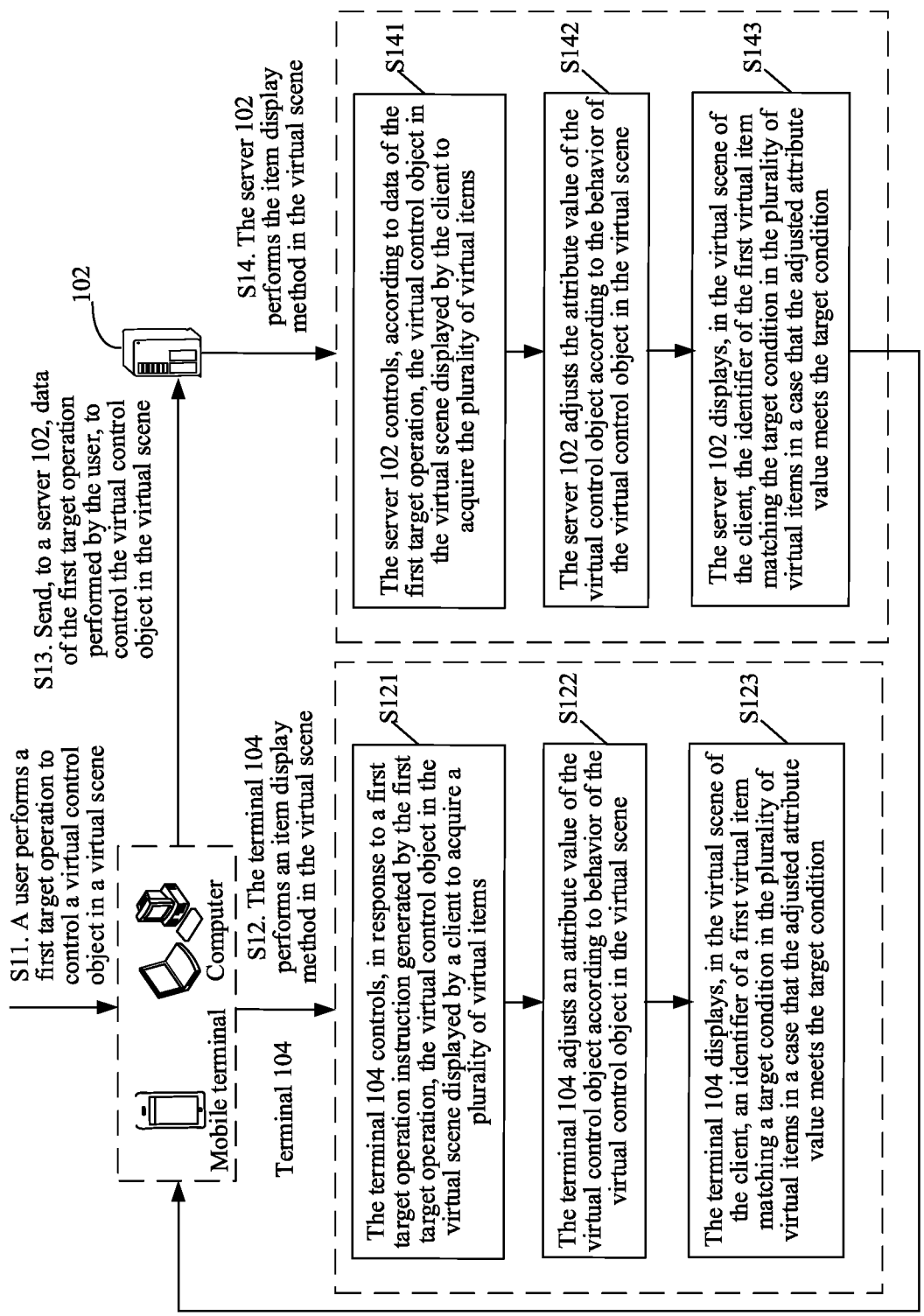
FIG. 1 is a schematic diagram of a hardware environment of an item display method in a virtual scene according to an embodiment of the present disclosure.

Optionally, in this embodiment, the item display method in the foregoing virtual scene may be applied to a hardware environment composed of a server 102 and a terminal 104 as shown in FIG. 1. FIG. 1 is a schematic diagram of a hardware environment of an item display method in a virtual scene according to an embodiment of the present disclosure. As shown in FIG. 1, the server 102 is connected to the terminal 104 by using a network. The network includes but is not limited to: a wide area network, a metropolitan area network, or a local area network, and the terminal 104 is not limited to a PC, a mobile phone, a tablet computer, and the like. The method for displaying items in the virtual scene in the embodiment of the present disclosure may be performed by the server 102, or may be performed by the terminal 104, or may be jointly performed by the server 102 and the terminal 104. The item display method in the virtual scene of the embodiment of the present disclosure may also be performed by a client installed on the terminal 104.

The item display method in the virtual scene of the embodiment may be applied to at least one shooting game, for example, at least one first-person shooting game (FPS for short) and a third-person shooting game (TPS for short), the hardware environment may relate to the following steps.

Step S11: A user performs a first target operation to control a virtual control object in a virtual scene.

Step S12: A terminal 104 performs an item display method in the virtual scene.

Step S121: The terminal 104 controls, in response to a first target operation instruction generated by the first target operation, a virtual control object in a virtual scene displayed by a client to acquire a plurality of virtual items.

Step S122: The terminal 104 adjusts an attribute value of the virtual control object according to behavior of the virtual control object in the virtual scene.

Step S123: The terminal 104 displays, in the virtual scene of the client, an identifier of a first virtual item matching a target condition in the plurality of virtual items in a case that the adjusted attribute value meets the target condition.

Step S13: Send data of the first target operation performed by the user to a server 102 to control the virtual control object in the virtual scene.

Step S14: The server 102 performs the item display method in the virtual scene.

Step S141: The server 102 controls, according to the data of the first target operation, the virtual control object in the virtual scene displayed by the client to acquire the plurality of virtual items.

Step S142: The server 102 adjusts the attribute value of the virtual control object according to the behavior of the virtual control object in the virtual scene.

Step S143: The server 102 displays, in the virtual scene of the client, the identifier of the first virtual item matching the target condition in the plurality of virtual items in a case that the adjusted attribute value meets the target condition.

The foregoing steps S11 to S12, or steps S11, S13, and step S14 include a complete implementation process of the technical solution of this application. The technical solution of this application mainly relates to step S12 or step S14. The technical solution of step S12 is described in detail below with reference to a specific embodiment, and the solution of the embodiment is exemplarily applied to a shooting game.

Figure 2:
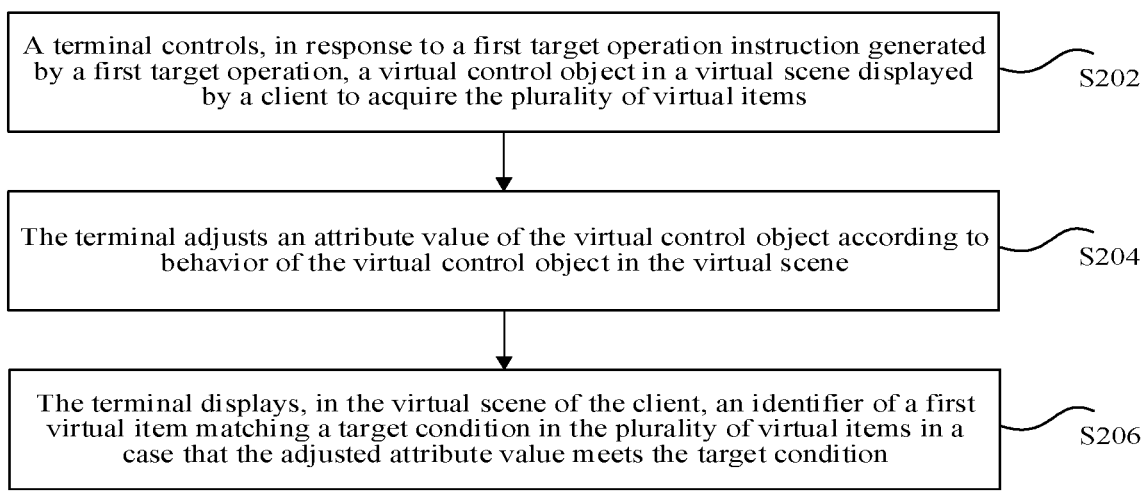
FIG. 2 is a flowchart of an item display method in a virtual scene according to an embodiment of the present disclosure.

FIG. 2 is a flowchart of an item display method in a virtual scene according to an embodiment of the present disclosure. As shown in FIG. 2, the method may include the following steps.

Step S202: A terminal controls, in response to a first target operation instruction generated by a first target operation, a virtual control object in a virtual scene displayed by a client to acquire a plurality of virtual items.

In the technical solution provided in the foregoing step S202 of this application, the foregoing virtual item is used for increasing the attribute value of the virtual control object.

In the embodiment, the client may be a shooting game client, for example, an FPS client or a TPS client. The virtual scene may be a game scene with a tight rhythm, a high requirement for operation efficiency, and a complex combat scene. For example, the game scene is an FPS scene or a TPS scene. The virtual control object may be virtual attack equipment such as a virtual gun, a pan, and the like controlled by a gamer in the virtual scene. The virtual scene is provided with the virtual item. The virtual item is a virtual prop in the virtual scene and used for increasing the attribute value of the virtual control object, which may be virtual attack accessory equipment equipped on virtual attack equipment in the virtual scene. For example, the virtual item includes different types of virtual attack accessory equipment such as medicines, scopes, bullets, body armor, and the like. Different virtual items have different designs in dimensions such as a recovery amount, a validation duration, a recovery category, a use duration, space occupation, and the like, which may be used for configuring virtual attack equipment in the virtual scene, so that the virtual item may be for being used in combination with the virtual attack equipment, to increase the attribute value of the virtual attack equipment.

Optionally, the attribute value of the virtual control object in the embodiment is used for indicating the combat situation of the virtual control object in the virtual scene, including attributes such as a health point of the virtual control object in the virtual scene. The attribute value may vary within different threshold ranges according to the behavior of the virtual control object in the virtual scene. For example, the health point of the virtual control object may vary within different threshold ranges as the virtual control object continues to fight in the virtual scene.

The first target operation of the embodiment may be a game operation performed by the gamer on the client for the virtual scene during the operation of the client. For example, the gamer generates a first operation instruction by picking up a virtual item on the client, to control the virtual control object in the virtual scene displayed by the client to acquire a plurality of virtual items.

In response to the first target operation instruction generated by the first target operation, the virtual control object in the virtual scene displayed by the client is controlled to acquire the plurality of virtual items. The plurality of virtual items acquired by the virtual control object may be a plurality of virtual items that are already picked up by the virtual control object in the virtual scene and that are stored in a virtual container in the virtual scene, and the virtual container may be a backpack corresponding to the virtual control object in the virtual scene.

Step S204: The terminal adjusts an attribute value of the virtual control object according to behavior of the virtual control object in the virtual scene.

In the technical solution provided in step S204 of this application, the behavior of the virtual control object in the virtual scene may be an activity performed by the virtual control object in the virtual scene, for example, the activity in which the virtual control object is attacked in the virtual scene. The activity of being attacked includes the virtual control object being hit in the virtual scene, for example, the virtual control object being hit by other virtual attack equipment such as a virtual gun or a pan in the virtual scene, the virtual control object falling to the ground, and the like. The behavior of the virtual control object in the virtual scene in the embodiment may further be an activity in which the virtual control object is rewarded in the virtual scene, and the like. The behavior of the virtual control object in the virtual scene may affect the attribute value of the virtual control object. For example, when the virtual control object is hit by other virtual attack equipment and falls to the ground, the health point of the virtual control object will decrease, and when the virtual control object is rewarded in the virtual scene, the health point of the virtual control object will increase.

The terminal of the embodiment adjusts the attribute value of the virtual control object according to the behavior of the virtual control object in the virtual scene, so that the attribute value of the virtual control object is adjusted with the behavior of the virtual control object in the virtual scene, for example, the attribute value of the virtual control object in the virtual scene may be increased or decreased with the behavior of the virtual control object in the virtual scene.

The behavior of the virtual control object in the virtual scene is merely an example of the embodiment of the present disclosure, and does not indicate that the behavior of the embodiment of the present disclosure is merely the foregoing behavior. Any behavior that may cause the attribute value of the virtual control object to be adjusted is within the scope of the embodiment of the present disclosure, which is not described one by one by using an example.

Step S206: The terminal displays, in the virtual scene of the client, an identifier of a first virtual item matching a target condition in the plurality of virtual items in a case that the adjusted attribute value meets the target condition.

In the technical solution provided in step S206 of this application, use requirements of the gamer is determined according to the adjusted attribute value of the virtual control object, a situation of the virtual items in the current backpack corresponding to the virtual control object is verified, and the first virtual item matching the target condition satisfied by the attribute value is selected from the plurality of virtual items acquired by the virtual control object.

Optionally, there are a plurality of sorted virtual items in the plurality of virtual items acquired by the virtual control object of the embodiment. After the terminal adjusts the attribute value of the virtual control object according to the behavior of the virtual control object in the virtual scene, the plurality of virtual items are sorted according to a threshold range in which the adjusted attribute value is located and that corresponds to the target condition, and may be sorted according to a priority in which the plurality of virtual items are used by the virtual control object in the virtual scene respectively. A first virtual item matching the threshold range of the attribute value is selected from the plurality of sorted virtual items. The first virtual item may be a virtual item that is most suitable for being used by the virtual control object currently in the plurality of virtual items, which may be used for increasing the attribute value of the virtual control object. In other words, the first virtual item is an optimal virtual item that may be used by the virtual control object currently. In a case that the first virtual item is for being used in combination with the virtual control object in the virtual scene, an operation level of the virtual control object in the virtual scene is higher than that of any virtual item other than the first virtual item in the plurality of virtual items. In a case that the virtual item is for being used in combination with the virtual control object in the virtual scene, the operation level of the virtual control object in the virtual scene can maximally conform to the use scene and the demand of the item, and a threshold for identifying the virtual item by a gamer in the virtual scene is maximally reduced.

For example, the attribute value of the virtual control object includes the health point, and the plurality of virtual items that have been acquired by the virtual control object include energy drinks, painkillers, epinephrine, bandages, first-aid kits, and health kits. When the health point of the virtual control object is 55%, the health point is within a threshold range of 50% to 75% of the full health point corresponding to the target condition, and a plurality of virtual items are sorted according to a priority of a plurality of virtual items used by the virtual control object when the health point is within a threshold range of 50% to 75%. A sorting result may be bandages, first-aid kits, health kits, energy drinks, painkillers, and epinephrine. Then a bandage is selected, from bandages, first-aid kits, health kits, energy drinks, painkillers, and epinephrine, as a first virtual item matching the health point of 55%, and the bandage is the first virtual item most suitable for being used by the virtual control object when the health point is 55%.

After the first virtual item matching the target condition is selected from the plurality of virtual items acquired by the virtual control object, the terminal displays an identifier of the first virtual item in the virtual scene of the client. The identifier of the first virtual item is used for indicating the first virtual item, which may be a text identifier, an icon identifier, or the like, and is for being selected for use in the virtual scene. In other words, the identifier of the first virtual item may be quickly selected by the gamer, so that the first virtual item may be for being used in combination with the virtual control object. Optionally, the identifier of the first virtual item is displayed in the shortcut use bar in the virtual scene, thereby implementing intelligent recommendation of the first virtual item. The shortcut use bar may be located at the lowest part in the middle of the virtual scene and may be transparently displayed in the virtual scene, so that the observation of the gamer on the combat situation in the virtual scene is not disturbed. According to the embodiment, the identifier of the virtual item located in the shortcut use bar may be quickly selected by the gamer, so that the selected virtual item is for being used in combination with the virtual control object, to maximally reduce the threshold for identifying the virtual item by the gamer, so that the gamer can quickly and accurately locate the virtual item corresponding to the attribute value of the virtual control object in the virtual scene when requiring a virtual item in the virtual scene, thereby improving the efficiency of displaying the virtual item.

Through step S202 to step S206, the terminal controls, in response to the first target operation instruction generated by the first target operation, the virtual control object in the virtual scene displayed by the client to acquire the plurality of virtual items, the virtual item being configured to increase the attribute value of the virtual control object. The terminal adjusts the attribute value of the virtual control object according to behavior of the virtual control object in the virtual scene. The terminal displays, in the virtual scene of the client, an identifier of the first virtual item matching the target condition in the plurality of virtual items in a case that the adjusted attribute value meets the target condition, the item identifier of the first virtual item being for being selected for use in the virtual scene. In other words, the first virtual item matching the target condition satisfied by the adjusted attribute value is automatically selected, according to the adjusted attribute value of the virtual control object, from the plurality of virtual items that have been acquired by the virtual control object, so that the first virtual item is displayed in the virtual scene, and a gamer does not need to adjust the virtual items in the item list in real time, finds and uses the required virtual items from a plurality of virtual items, thereby achieving the purpose of intelligently recommending virtual items in the virtual scene, so that the first virtual item that matches the adjusted attribute value of the virtual control object can be quickly and accurately located, and the technical effect of improving the efficiency of displaying the item is achieved, thereby resolving the technical problem of low efficiency of displaying the item in the related art.

In an optional implementation, step S206 of displaying, by the terminal, in the virtual scene of the client, an identifier of a first virtual item matching a target condition in the plurality of virtual items in a case that the adjusted attribute value meets the target condition includes: displaying, by the terminal in the virtual scene of the client, an identifier of the first virtual item matching the target value interval in the plurality of virtual items in a case that the adjusted attribute value is in the target value interval corresponding to the target condition, different preset value intervals matching different virtual items, the different value intervals including the target value interval, and the different virtual items including the first virtual item.

In the embodiment, the attribute value of the virtual control object in the virtual scene may be adjusted according to the combat situation of the virtual control object in the virtual scene. For example, the attribute value of the virtual control object in the virtual scene may be adjusted to rise or fall according to the combat situation of the virtual control object in the virtual scene. The attribute value has a plurality of preset value intervals, and the value interval is also the threshold range in which the attribute value is located. For example, the attribute value of the virtual control object is the health point, and a plurality of value intervals of the health point may be respectively set to full health points, 75% to 100% of full health points, 50% to 75% of full health points, 25% to 50% of full health points, and 0% to 25% of full health points.

The target condition satisfied by the adjusted attribute value of the embodiment corresponds to a target value interval. The terminal displays, in the virtual scene of the client, an identifier of the first virtual item matching the target value interval in the plurality of virtual items in a case that the adjusted attribute value is in the target value interval corresponding to the target condition. Because different virtual items have different dimensions such as a recovery quantity, a validation duration, a recovery category, a use duration, space occupation, and the like, the virtual items that need to be preferentially used by the virtual control objects corresponding to different value intervals may be different. For example, when the target value interval is 75% to 100% of the full health points, the matched first virtual item may be an energy drink, which is convenient for the gamer to use health replenishing medicine. When the target value interval is 50% to 75% of the full health points, the matched first virtual item is a bandage, which is convenient for the gamer to replenish a small quantity of health points for many times. When the target value interval is 25% to 50% of the full health points, the matched first virtual item is a first-aid kit, which is convenient for the gamer to replenish a relatively large quantity of health points at a time. When the target value interval is 0% to 25% of the full health points, the matched first virtual item is a health kit, which is convenient for the gamer to replenish a large quantity of health points at a time, thereby avoiding a case that in a complex game scene, after an intense and exciting combat, the gamer also needs to find and use the required virtual items from the plurality of virtual items, so that the threshold for identifying the items by the gamer is maximally reduced, and the virtual item corresponding to the attribute value of the virtual control object in the virtual scene is further quickly and accurately positioned, thereby improving the efficiency of displaying the items.

Optionally, each time the attribute value of the virtual control object is adjusted between different value intervals, the plurality of virtual items are rearranged according to the new value interval in which the attribute value is located, and the identifier of the most suitable virtual item is placed in the shortcut use bar in the virtual scene for display, which is convenient for the gamer to quickly click and use the virtual item. When the attribute value of the virtual control object changes within a value interval, the plurality of virtual items are still sorted according to the value interval.

In an optional implementation, a smaller adjusted attribute value or a smaller boundary value of the target value interval of the adjusted attribute value leads to a larger value that is added by the first virtual item to the attribute value of the virtual control object.

In the embodiment, the first virtual item may be used for increasing the attribute value of the virtual control object, and a smaller adjusted attribute value leads to a larger value that is added by the matched first virtual item to the attribute value of the virtual control object. For example, when the adjusted attribute value is 85% of the full health points, the matched first virtual item is an energy drink, and the energy drink may facilitate quick use of the health replenishing medicine by the virtual control object. When the adjusted attribute value is 15% of the full health points, 15% is less than 85%. The matched first virtual item is a health kit. Compared with the energy drink, the health kit may facilitate replenishing of a large quantity of health points by the gamer at a time, so that the threshold for identifying the items by the gamer is maximally reduced, and the virtual item corresponding to the attribute value of the virtual control object in the virtual scene is quickly and accurately positioned, thereby improving the efficiency of displaying the items.

Optionally, a smaller boundary value of the target value interval in which the adjusted attribute value is located leads to a larger value added by the matched first virtual item to the attribute value. A smaller right boundary value and/or left boundary value of the adjusted attribute value leads to a larger value added by the matched first virtual item to the attribute value. For example, when the adjusted attribute value is between 75% and 100% of the target value interval, the matched first virtual item is an energy drink, and the energy drink may facilitate quick use of health replenishing medicine by the virtual control object. When the adjusted attribute value is within the target value interval of 0% to 25%, 0% of the left boundary value is less than 75% of the left boundary value, and 25% of the right boundary value is less than 100% of the right boundary value. The matched first virtual item is a health kit, and the health kit may facilitate, relative to the energy drink, replenishing of a large quantity of health points at a time by the gamer.

In an optional implementation, after step S206 in which the terminal displays, in the virtual scene of the client, an identifier of a first virtual item matching a target condition in the plurality of virtual items, the method further includes: detecting, by the terminal, an item adjustment instruction on the client; and adjusting, by the terminal in response to the item adjustment instruction, the identifier of the first virtual item displayed in the virtual scene of the client to an identifier of a second virtual item in the plurality of virtual items, the identifier of the second virtual item being for being selected for use in the virtual scene.

In the embodiment, the gamer may actively select, according to preferences and requirements, the virtual item to be used by the virtual control object in the virtual scene. After the terminal displays the first virtual item in the virtual scene of the client, the item adjustment instruction may be detected on the client. The item adjustment instruction may be an instruction generated by the operation of the gamer on the second virtual item in the plurality of virtual items acquired by the virtual control object. In other words, the gamer manually selects the second virtual item in the plurality of virtual items instead of relying on the intelligently recommended first virtual item. The foregoing operation may be a one-click operation, a double-click operation, a sliding operation, and the like, and no limitation is imposed herein. The second virtual item is any virtual item actively selected by the gamer from the plurality of virtual items according to preferences and requirements.

After the terminal detects the item adjustment instruction on the client, in response to the item adjustment instruction, the identifier of the first virtual item displayed by the client in the virtual scene is adjusted to the identifier of the second virtual item in the virtual items acquired by the virtual control object, and the identifier of the first virtual item displayed in the shortcut use bar in the virtual scene may be adjusted to the identifier of the second virtual item. The identifier of the second virtual item is for being selected for use in the virtual scene, that is, the identifier of the second virtual item may be quickly selected by the gamer, so that the second virtual item is for being quickly used in combination with the virtual control object.

Optionally, in the embodiment, when the attribute value of the virtual control object continuously changes, for example, when the attribute value of the virtual control object continuously decreases, or when the attribute value of the virtual control object decreases to a certain value, the terminal detects an item adjustment instruction on the client, in response to the item adjustment instruction, adjusts, to the identifier of the second virtual item in the virtual item acquired by the virtual control object, the identifier of the first virtual item displayed by the client in the virtual scene, so that the second virtual item is for being used in combination with the virtual control object, thereby avoiding a case that the gamer cannot actively select, according to requirements, the virtual item to be used in the virtual scene, and preventing the gamer from being interfered in selection by the system, causing a failure to meet the requirements of the gamer for the item and causing troubles.

In the embodiment, the gamer is given the right to manually select the virtual item, to prevent the system from interfering with a choice of the gamer. In other words, the gamer may select the most desired virtual item according to the battle situation of the current virtual scene to be used by the virtual control object in the virtual scene, so that the choice of the gamer is respected when the requirements of the gamer are satisfied, which effectively ensures that the optimal virtual item is recommended to the gamer without excessively interfering with the game progress of the gamer, thereby improving the efficiency of displaying the items.

In an optional implementation, the detecting, by the terminal, an item adjustment instruction on the client includes: detecting, by the terminal, the item adjustment instruction on the client in a case that a target value interval of the adjusted attribute value is a preset value interval.

In the embodiment, when the attribute value is set in some value intervals, the gamer is allowed to actively select the virtual item to be used in the virtual scene. In a case that the target value interval of the adjusted attribute value is the preset value interval, the terminal detects the item adjustment instruction on the client. For example, when the attribute value of the virtual control object is a health point, the preset value interval may be full health points, and 0 to 25% of the full health points. The gamer may select, from the virtual items to the shortcut use bar in the virtual scene, any virtual item to be used. In this way, the terminal detects the item adjustment instruction on the client to adjust the identifier of the first virtual item displayed in the virtual scene of the client to the identifier of the second virtual item in the virtual item that has been acquired by the virtual control object, thereby respecting the choice of the gamer while meeting the requirements of the gamer, and improving the efficiency of displaying the items.

In an optional implementation, after the adjusting, by the terminal, identifier of first virtual item displayed in the virtual scene of the client to an identifier of a second virtual item in plurality of virtual items, the method further includes: forbidding displaying, by the terminal during a target time, the identifier of the first virtual item in the virtual scene of the client, the target time being a period of time during which the identifier of the first virtual item displayed in the virtual scene is adjusted to the identifier of the second virtual item.

In the embodiment, the terminal forbids displaying, during a target time, the identifier of the first virtual item in the virtual scene of the client after adjusting the identifier of the first virtual item displayed in the virtual scene of the client to the identifier of the second virtual item in the virtual item that has been acquired by the virtual control object. The target time may be a recommended cooling time, that is, a time during which the optimal virtual item is not allowed to be recommended to the gamer. For example, the target time is 30 seconds. No more optimal virtual items will be recommended to gamers within 30 seconds. Optionally, after the target time, the first virtual item may be selected and displayed in the virtual scene of the client, that is, the optimal virtual item is allowed to be recommended to the gamer, so that the choice of the gamer is respected when the requirements of the gamer are satisfied, thereby improving the efficiency of displaying the items.

In an optional implementation, the method further includes: setting, by the terminal, the target time in response to a second target operation instruction generated by a second target operation.

In the embodiment, the target time may be set. Optionally, after the virtual control object controlled by the gamer enters the virtual scene, the gamer may set the target time by using the second target operation instruction generated by the second target operation, for example, by directly inputting the set target time, or by selecting the target time from a plurality of preset times by using a pull-down menu, and no limitation is imposed herein, thereby improving the flexibility of setting the cooling time.

In an optional implementation, the displaying, by the terminal, in the virtual scene of the client, an identifier of a first virtual item matching a target condition in the plurality of virtual items in a case that the adjusted attribute value meets the target condition includes: sorting, by the terminal, a plurality of virtual items according to a target arrangement order matching a target value interval in a case that the adjusted attribute value is in the target value interval corresponding to the target condition, different preset value intervals matching different arrangement orders, the different value intervals including the target value interval, and the different arrangement orders including the target arrangement order; and displaying, by the terminal in the virtual scene of the client, the identifier of the first virtual item matching the target value interval in the plurality of sorted virtual items.

In the embodiment, when the terminal displays the identifier of the first virtual item matching the target condition in the plurality of virtual items, the plurality of virtual items may be sorted according to the target value interval in which the adjusted attribute value is located, and the target value interval corresponds to the target condition. Different preset value interval may correspond to different sorting order. For example, the attribute value of the virtual control object is the health point. When 75%≤health point≤100%, the plurality of virtual items are sorted as energy drinks, painkillers, epinephrine, bandages, first-aid kits, and health kits. When 50%≤health point≤75%, the plurality of virtual items are sorted as bandages, first-aid kits, health kits, energy drinks, painkillers, and epinephrine. When 25%≤health point≤50%, the plurality of virtual items are sorted as first-aid kits, health kits, bandages, energy drinks, painkillers, and epinephrine. When 0%≤health point≤25%, the plurality of virtual items are sorted as health kits, first-aid kits, bandages, energy drinks, painkillers, and epinephrine, thereby realizing intelligent sorting of the plurality of virtual items according to attribute value of the virtual control object, which avoids a case that gamer needs to adjust positions of identifiers of the virtual items in the item list in real time, to relieve tiredness and irritability caused by a complex game scene, avoids great perplexity caused by the gamer selecting, from a long and fixed virtual item list, the virtual items to be used, and avoids the problems that the long virtual item list is difficult to quickly identify, causes great obstacles to clicking, and has poor interactive experience.

After the terminal sorts a plurality of virtual items according to the target value interval that corresponds to the target condition and that is of the attribute value, the terminal selects, from the plurality of sorted virtual items, a first virtual item matching the target value interval. The first virtual item is a virtual item most suitable for being used by the virtual control object at present. For example, the attribute value of the virtual control object is a health point, and when 75%≤health point≤100%, the terminal selects the energy drink as the first virtual item from the plurality of sorted virtual items. When 50%≤health point≤75%, the terminal selects the bandage as the first virtual item from the plurality of sorted virtual items. When 25%≤health point≤50%, the terminal selects the first-aid kit as the first virtual item from the plurality of sorted virtual items. When 0%≤health point≤25%, the terminal selects the health kit as the first virtual item from the plurality of sorted virtual items, thereby realizing the intelligent recommendation of the virtual items most suitable for use by the virtual control object, so that the gamer can quickly identify the virtual item most suitable for use by the virtual control object, thereby improving the efficiency of displaying the items.

In an optional implementation, the sorting, by the terminal, a plurality of virtual items according to a target arrangement order matching the target value interval in a case that the adjusted attribute value is in the target value interval corresponding to the target condition includes: determining, by the terminal according to the target value interval in a case that the adjusted attribute value is in the target value interval corresponding to the target condition, a priority order in which the plurality of virtual items are respectively for being used in combination with the virtual control object in the virtual scene, the target arrangement order including the priority order; and sorting, by the terminal, the plurality of virtual items according to the priority order. The displaying, by the terminal in the virtual scene of the client, the identifier of the first virtual item matching the target value interval in the plurality of sorted virtual items includes: determining, by the terminal, a virtual item in the first priority in the priority order in the plurality of sorted virtual items as the first virtual item, and displaying the identifier of the first virtual item in the virtual scene of the client, the first priority being used for indicating that the first virtual item has priority over virtual items other than the first virtual item in the plurality of virtual items, and the virtual item being for being used in combination with the virtual control object in the virtual scene.

In the embodiment, when the terminal sorts the plurality of virtual items acquired by the virtual control object according to the target value interval of the attribute value and the target arrangement order, the priority in which the plurality of virtual items are for being used in combination with the virtual control object in the virtual scene may be determined according to the target value interval of the adjusted attribute value of the virtual control object, and the plurality of virtual items are sorted according to the priority order of the plurality of virtual items. For example, the terminal determines the use requirements of the virtual control object for the plurality of virtual items according to the threshold range of the current health point of the virtual control object in the virtual scene, verifies the use condition of the plurality of virtual items in the backpack in the virtual scene, and prioritizes the plurality of virtual items. The terminal may arrange, in a position convenient for the gamer to select, the virtual item that is most suitable for the current use of the virtual control object, for example, at the forefront of a list, which is convenient for the gamer to click and select, realizing the intelligent sorting of the plurality of virtual items, and maximally satisfying the use scenes and requirements of the object.

Optionally, the terminal of the embodiment determines the virtual item at the first priority in the priority order in the plurality of sorted virtual items as the first virtual item, and arranges the first virtual item in a position convenient for the gamer to select, and the first virtual item may be displayed in the shortcut use bar in the virtual scene, thereby maximally reducing the threshold for identifying the virtual item by the gamer, so that the gamer can use the virtual item that is currently most suitable for use by the virtual control object when needed.

In an optional implementation, the determining, by the terminal according to the target value interval in a case that the adjusted attribute value is in the target value interval corresponding to the target condition, a priority order in which the plurality of virtual items are respectively for being used in combination with the virtual control object in the virtual scene includes: determining, by the terminal according to the target value interval and information about the plurality of virtual items in a case that the adjusted attribute value is in the target value interval corresponding to the target condition, a priority order in which the plurality of virtual items are respectively for being used in combination with the virtual control object in the virtual scene. The information about the virtual item includes at least one of the following: a quantity of the virtual items; a type of the virtual item; whether the virtual item is currently selected to be for being used in combination with the virtual control object in the virtual scene; and whether the virtual item is currently already for being used in combination with the virtual control object in the virtual scene.

In the embodiment, the terminal may determine, according to the target value interval of the adjusted attribute value and the information about the plurality of virtual items, the priority order in which the plurality of virtual items are respectively for being used in combination with the virtual control object in the virtual scene. The information about the plurality of virtual items may be information such as the situation of the plurality of virtual items in the backpack in the virtual scene and the use requirements of the plurality of virtual items, which includes a quantity of virtual items in the virtual scene, the type of virtual items, whether the virtual item is currently selected to be for being used in combination with the virtual control object in the virtual scene, whether the virtual item is currently already used in combination with the virtual control object in the virtual scene, and the like.

Optionally, when the quantity of virtual items in the virtual scene is 0, it indicates that the virtual items have been used up by the virtual control object; the types of virtual items may include different types of medicines; whether the virtual item is currently selected as the virtual item and is to be used by the virtual control object; whether the virtual item is currently already for being used in combination with the virtual control object in the virtual scene, whether the virtual item is currently already used by the virtual control object, and the like.

After the terminal determines, according to the target value interval of the adjusted attribute value and the information about the plurality of virtual items, the priority order in which the plurality of virtual items are respectively for being used in combination with the virtual control object in the virtual scene, the terminal determines the virtual item in the first priority in the priority order in the plurality of sorted virtual items as the first virtual item, and further displays the first virtual item in the virtual scene, so that the first virtual item which meets the attribute value of the virtual control object is quickly and accurately positioned, thereby improving the efficiency of displaying the virtual item.

In an optional implementation, before the terminal displays, in the virtual scene of the client, the identifier of the first virtual item matching the target condition in the plurality of virtual items, the method further includes at least one of the following: sorting, by the terminal, the plurality of virtual items in response to a third target operation instruction generated by a third target operation; displaying, by the terminal, in the virtual scene in response to a fourth target operation instruction generated by a fourth target operation, an identifier of a third virtual item selected from the plurality of sorted virtual items, the identifier of the third virtual item being for being selected for use in the virtual scene; and setting, by the terminal in response to a fifth target operation instruction generated by a fifth target operation, frequency at which the identifier of the first virtual item matching the target condition in the plurality of virtual items is displayed in the virtual scene of the client.

In the embodiment, before the terminal displays the identifier of the first virtual item matching the target condition in the plurality of virtual items in the virtual scene of the client, the gamer may manually set the order of the plurality of virtual items according to preferences and requirements, and the terminal may sort, in response to the third target operation instruction generated by the third target operation of the gamer, the plurality of virtual items acquired by the virtual control object.

The gamers may further select, according to their preferences and requirements, virtual items that need to be displayed in the virtual scene. The terminal displays, in the virtual scene in response to the fourth target operation instruction generated by the fourth target operation, the third virtual item selected from the plurality of sorted virtual items, and the terminal may display the third virtual item in the shortcut use bar of the virtual scene, the third virtual item being for being selected for use in the virtual scene.

The gamer may further manually set the frequency of intelligently recommending the first virtual item, and the terminal sets, in response to the fifth target operation instruction generated by the fifth target operation generated by the gamer, the frequency at which the identifier of the first virtual item matching the target condition in the plurality of virtual items is displayed in the virtual scene of the client. In other words, the recommendation frequency of intelligently recommending the first virtual item is adjusted, to adapt to the real-time changing attribute value and quickly select the first virtual item matching the attribute value, so that the first virtual item matching the attribute value of the virtual control object can be quickly and accurately positioned, thereby improving the efficiency of displaying the item.

In an optional implementation, before the terminal displays, in the virtual scene of the client, the identifier of the first virtual item matching the target condition in the plurality of virtual items, the method further includes: acquiring, by the terminal, a historical attribute value of the virtual control object in the virtual scene in a past time period and a virtual item for being used in combination with the virtual control object in the past time period; training, by the terminal, a preset model by using the historical attribute value and the virtual item for being used in combination with the virtual control object in the past time period, to obtain a trained target model; and determining, by the terminal by using the target model and the current adjusted attribute value of the virtual control object in the virtual scene, the first virtual item matching the target condition.

In the embodiment, the preset model may be an initially built detection model, that is, the preset model is an initial detection model. The terminal trains the preset model by using the historical attribute value of the virtual control object in the virtual scene in the past time period and the virtual item for being used in combination with the virtual control object in the past time period. The obtained trained preset model may be used for determining, according to the adjusted attribute value of the virtual control object in the virtual scene, the first virtual item that is most suitable for the virtual control object to use at present. The historical attribute value of the virtual control object in the virtual scene in the past time period may be used as battle data of the virtual control object in the virtual scene.

Optionally, in the embodiment, the preset model may be an initial neural network model. The initial neural network model is described based on a mathematical model of a neuron, and the neuron is established by using the initially collected attribute value of the virtual control object and data of the virtual item for being used in combination with the virtual control object.

Optionally, in the embodiment, the historical attribute value of the virtual control object in the virtual scene in the past time period and the data of the virtual item for being used in combination with the virtual control object in the past time period are analyzed through machine learning, to train the preset model through learning. When the historical attribute value of the virtual control object in the virtual scene in the past time period and the data of the virtual item for being used in combination with the virtual control object in the past time period are analyzed through machine learning, the historical attribute value and the data of the virtual item for being used in combination with the virtual control object in the past time period may be preprocessed according to algorithms such as a distribution consistency algorithm, denoising, sampling, and the like, and feature extraction, feature transformation, feature normalization, and feature combination are performed on the preprocessed data to obtain a feature for training the preset model. Further, the feature is processed by using an optimization algorithm, a hypothesis function, a loss function, a decision boundary, a convergence speed, an iteration policy, and the like, to obtain a label of the relationship between the attribute value in the virtual scene and the virtual item used by the virtual control object, and then the preset model is trained by using the label of the relationship between the attribute value in the virtual scene and the virtual item used by the virtual control object, to obtain a trained target model. Finally, evaluation such as cross-validation, target evaluation, over-fitting, and under-fitting is performed on the trained target model to determine the target model for determining the first virtual item that is currently most suitable for use by the virtual control object in the virtual scene, and the first virtual item currently most suitable for use by the virtual control object is determined according to the current adjusted attribute value and the target model of the virtual control object in the virtual scene.

In an optional implementation, step S202 of controlling, by a terminal, in response to a first target operation instruction generated by a first target operation, a virtual control object in a virtual scene displayed by a client to acquire a plurality of virtual items includes: controlling, by the terminal in response to the first target operation instruction generated by the first target operation, virtual attack equipment in a virtual scene displayed by a shooting game client to acquire a plurality of pieces of virtual attack accessory equipment, the virtual attack accessory equipment being configured to increase an attribute value of the virtual attack equipment, the client including the shooting game client, the virtual control object including the virtual attack equipment, and the virtual item including the virtual attack accessory equipment. Step S204 of adjusting, by the terminal, an attribute value of the virtual control object according to behavior of the virtual control object in the virtual scene includes: adjusting, by the terminal, the attribute value of the virtual attack equipment according to behavior of the virtual attack equipment in the virtual scene. Step S206 of displaying, by the terminal, in the virtual scene of the client, an identifier of a first virtual item matching a target condition in the plurality of virtual items in a case that the adjusted attribute value meets the target condition includes: displaying, by the terminal, in the virtual scene of the shooting game client, an identifier of first virtual attack accessory equipment matching the target condition in the plurality of pieces of virtual attack accessory equipment in a case that the adjusted attribute value meets the target condition.

In the embodiment, the item display method in the virtual scene may be applied to a shooting game, and the shooting game may be an FPS or a TPS. The client may be a shooting game client, for example, an FPS client or a TPS client. The virtual control object may be virtual attack equipment in the shooting game, for example, the virtual attack equipment is a virtual gun, a pan, and the like controlled by a gamer. The virtual item may be virtual attack accessory equipment to be equipped on the virtual attack equipment, for example, virtual attack accessory equipment such as a scope, a bullet, and the like equipped on the virtual gun. The virtual attack accessory equipment is configured to increase an attribute value of the virtual attack equipment.

The terminal controls, in response to the first target operation instruction generated by the first target operation, the virtual attack equipment in the virtual scene displayed by the shooting game client to acquire a plurality of pieces of virtual attack accessory equipment, and the terminal adjusts, according to the behavior of the virtual attack equipment in the virtual scene, the attribute value of the virtual attack equipment. The attribute value may include an attribute such as the health point, and the like of the virtual attack equipment in the virtual scene. The attribute value may change within different threshold ranges according to the behavior of the virtual attack equipment in the virtual scene. For example, the health point of the virtual attack equipment will be reduced or rewarded as the virtual control object continues to fight in the virtual scene, and the health point will be reduced or increased within different threshold ranges.

The terminal may select the first virtual attack accessory equipment matching the target condition from the plurality of pieces of virtual attack accessory equipment in a case that the adjusted attribute value meets the target condition. Optionally, the virtual attack accessory equipment acquired by the virtual attack equipment of the embodiment has a plurality of pieces of sorted virtual attack accessory equipment. After the terminal adjusts the attribute value of the virtual attack equipment according to the behavior of the virtual attack equipment in the virtual scene, the terminal sorts the plurality of pieces of virtual attack accessory equipment according to the threshold range that corresponds to the target condition and that is of the adjusted attribute value. The virtual attack accessory equipment may be sorted according to a priority in which the plurality of pieces of virtual attack accessory equipment is respectively used by the virtual attack equipment in the virtual scene. The terminal selects, from the plurality of pieces of sorted virtual attack accessory equipment, first virtual attack accessory equipment matching the threshold range of the adjusted attribute value, may determine the use requirement of the gamer according to the adjusted attribute value of the virtual attack equipment, verifies the condition of the virtual attack accessory equipment in the current backpack corresponding to the virtual attack equipment, and selects the first virtual attack accessory equipment from the virtual attack accessory equipment acquired by the virtual attack equipment.

After the first virtual attack accessory equipment matching the target condition is selected from the plurality of pieces of virtual attack accessory equipment acquired by the virtual attack equipment, the terminal displays an identifier of the first virtual attack accessory equipment in the virtual scene of the shooting game client. The identifier of the first virtual attack accessory equipment is for being selected for use in the virtual scene. In other words, the identifier of the first virtual attack accessory equipment may be quickly selected by the gamer, so that the first virtual attack accessory equipment is for being used in combination with the virtual attack equipment. The terminal may display the identifier of the first virtual attack accessory equipment in the shortcut use bar of the virtual scene, thereby implementing intelligent recommendation of the first virtual attack accessory equipment.

According to the adjusted attribute value of the virtual attack equipment, the terminal of the embodiment automatically selects, from the plurality of pieces of virtual attack accessory equipment acquired by the virtual attack equipment, the first virtual attack accessory equipment matching the adjusted attribute value, and further displays, in the virtual scene, the first virtual attack accessory equipment matching the adjusted attribute value, thereby avoiding the need for the gamer to adjust the virtual attack accessory equipment in the list of virtual attack accessory equipment in real time. The gamer can find the required virtual attack accessory equipment for use from the plurality of pieces of virtual attack accessory equipment, thereby realizing intelligent recommendation of the virtual attack accessory equipment in the virtual scene, so that the terminal can quickly and accurately locate the virtual attack accessory equipment that meets the adjusted attribute value of the virtual control object, thereby achieving the technical effect of improving the efficiency of displaying the virtual attack accessory equipment.

According to the item display method in the virtual scene of the embodiment, all items currently picked up by the gamer can be prioritized, and the virtual item with a high priority is arranged in front to facilitate clicking by the gamer. According to the embodiment, the use requirements of the gamer may be determined according to the current attribute value of the virtual control object, the condition of the virtual item in the current backpack of the gamer is verified, and the optimal virtual item is recommended to the shortcut use bar. The threshold for identifying the item by the gamer is maximally reduced, so that the gamer can use the most desired virtual item when needed. In the embodiment, a plurality of value intervals are further set for the attribute value of the gamer. The virtual items in the current backpack are rearranged whenever the attribute value of the virtual control object changes within different value intervals, and the most suitable virtual item is placed in the shortcut use bar, so that the gamer can click and use the virtual item rapidly. When the attribute value of the virtual control object changes within a value interval, the items are arranged in the same order. In the embodiment, dynamic analysis is performed according to an upward interval and a downward interval of the attribute value of the virtual control object, the virtual item currently most suitable for use by the virtual control object is intelligently recommended, thereby maximally satisfying the use scene and requirements of the virtual item. In the intelligent recommendation solution of the embodiment, the gamer is still given the right to manually select the item, and the gamer may still select the most desired virtual item to use in the shortcut use bar according to the current fight situation. After the gamer actively selects the desired medicine, the optimal virtual items will not be recommended to the gamer in the target time. The selection of the gamer is respected while the requirements of the gamer are satisfied, thereby effectively ensuring that the optimal virtual item can be recommended without too much interference to the game process of the gamer.

According to the item display method in the virtual scene of the embodiment, the threshold for the novice gamer to identify items may be significantly reduced, so that the gamer can follow the game rhythm faster. The method accords with the game characteristic of a mobile terminal game, and can greatly reduce the obstacles for the gamer to perform complex operations on a mobile terminals, which facilitates quick positioning by the gamer and meets the requirements of the gamer in the intense and exciting game process, reducing learning costs of the gamer and improving the efficiency of displaying the items.

The technical solution of the present disclosure is to be described below with reference to exemplary embodiments. Specifically, the item is used as the medicine in the virtual scene by using an example for description.

In the embodiment, in order to reduce the threshold for identifying the virtual items in the virtual scene by the gamer and meet the use requirements of the gamer for convenient items in complex combat situations, a solution for intelligently recommending an item is provided.

In the solution, the system recommends the most suitable virtual item for the gamer in real time according to the current health point of the virtual control object corresponding to the gamer, thereby simplifying use operations of the gamer on the item, so that the gamer can recover to the combat state as quickly as possible. The virtual control object may be an object controlled by the gamer in the virtual scene, for example, virtual attack equipment such as a virtual gun, a pan, and the like, and the item may be virtual attack accessory equipment equipped on the virtual attack equipment, for example, body armor, bullets, medicines, and the like.

In the embodiment, the system prioritizes all items picked up in the backpack of the gamer, and the virtual item with a higher priority is arranged in front to facilitate clicking operations by the gamer.

In the embodiment, the use requirement of the item may be determined according to the current attribute of the virtual control object corresponding to the gamer, and the situation of the current item in the backpack corresponding to the gamer is verified, so that the optimal virtual item is recommended to the shortcut use bar in the virtual scene, and the gamer can quickly obtain the optimal virtual item from the shortcut use bar, thereby maximally reducing the threshold for identifying the item by the gamer. The optimal virtual item is also the most suitable virtual item used by the virtual control object in the virtual scene, so that the gamer can quickly use the most desired virtual item when needing to use the item. The current attribute of the virtual control object may be the condition of the health point of the virtual control object.

The system of this embodiment sets a plurality of different thresholds for the health point standard of the virtual control object corresponding to the gamer. The system rearranges current items in the backpack corresponding to the gamer whenever the health point of the virtual control object changes within different thresholds, and the most suitable virtual item is placed in the shortcut use bar for display, so that the gamer can click and use the virtual item rapidly when needing the virtual item in the shortcut use bar. When the health point of the virtual control object corresponding to the gamer changes within the threshold, a plurality of items in the backpack are arranged in the same order.

According to the intelligent recommendation solution of the embodiment, dynamic analysis may be performed according to an upward interval and a downward interval of the health point change of the virtual control object. In other words, dynamic analysis is performed with the health increase or decrease of the virtual control object to recommend the optimal virtual item, maximally satisfying the use scene and requirements of the gamer for the items.

In the intelligent recommendation solution of the embodiment, the gamer is still given the right to manually select the item, and the gamer may still select, according to the current fight situation in the virtual scene, the most desired virtual item to display in the shortcut use bar for convenient use. When the gamer actively selects a virtual item that he/she wants to use, the system will not recommend the optimal virtual item to the gamer within a certain period of time. For example, the optimal virtual item will not be recommended to the gamer within 30 seconds, thereby respecting the choice of the gamer while meeting the requirement of the gamer for the item, so that it can be effectively ensured that the optimal virtual item can be recommended without much interference to the game process of the gamer.

Optionally, after 30 seconds, the system may continue to recommend the optimal virtual item to the gamer.

TABLE 1

| | Intelligent Recommendation Form for Medicines Intelligent Recommendation Solution for Medicines |
|---|---|
| Shortcut | Click a shortcut button to directly use/switch the current virtual item |
| Unfold the list | Click the unfold button above the shortcut button to unfold the list of items. Click the virtual item in the list to replace the virtual item in the shortcut use bar with the target virtual item, and fold the list Unfold a same quantity of lists as that of items of a virtual control object After clicking the fold button, or after X seconds (configurable), fold the unfolded list |
| General sorting rules for medicines | When only the first medicine is picked up, this medicine is directly placed in the shortcut use bar Place the medicine in the list when picking up a subsequent medicine Each time a new virtual item is picked up, rearrange 2 to 6 items When there are N medicines, (N-1) boxes will be unfolded and sorted in the following order: bandages, first-aid kits, health kits, energy drinks, painkillers, and epinephrine. Arrange the medicine with higher priority in front, which will not affect the medicine in the shortcut use bar After the medicine currently displayed in the shortcut use bar is used, if the medicine still remains, make no change to the shortcut use bar; if the medicine does not remain, display the next medicine of the used medicine in the shortcut use bar according to the order of medicines |
| Intelligent sorting rules for medicines | When there are N medicines, (N-1) boxes will be unfolded and sorted in the following order, and the medicine with a high priority is arranged in front |
| | Health point = 100%: energy drink, painkiller, epinephrine, bandage, first-aid kit, and health kit |
| | 75% ≤ health point < 100%: energy drink, painkiller, epinephrine, bandage, first-aid kit, and health kit |
| | 50% ≤ health point < 75%: bandage, first-aid kit, health kit, energy drink, painkiller, and epinephrine |
| | 25% ≤ health point < 50%: first-aid kit, health kit, bandage, energy drink, painkiller, and epinephrine |
| | 0% ≤ health point < 25%: health kit, first-aid kit, bandage, energy drink, painkiller, and epinephrine |
| | When the first medicine is picked up, this medicine is directly placed in the shortcut use bar When the health point is 100%, each time a new medicine is picked up, 2 to 6 medicines are rearranged once When the health point is less than 100%, each time a new medicine is picked up, 1 to 6 medicines are rearranged once |

TABLE 1-continued

Intelligent Recommendation Form for Medicines
Intelligent Recommendation Solution for Medicines

| | |
|---|---|
| | The foregoing order will take effect once in each interval when the health point of the gamer decreases in the foregoing interval, which is convenient for the gamer to adjust |
| | The foregoing order will take effect once in each interval when the health point of the gamer increases in the foregoing interval and reaches 75% from below 75% HP, which is convenient for the gamer to adjust |
| | After the shortcut medicine in the shortcut use bar is used, if the medicine still remains, make no change to the shortcut use bar; if the medicine does not remain, display the next medicine of the used medicine in the shortcut use bar according to the order of medicines |
| | Give a description in the settings, and make a switch for the gamer to choose; if the switch is not selected, the general sorting rules are used; and if the switch is selected, the intelligent sorting rules are used. |
| Active use of medicines | When the virtual control object corresponding to the gamer is fighting in the virtual scene, after actively switching to a certain medicine, the system no longer recommends the medicine on the shortcut use bar within 30 seconds, but still sorts the medicine in the list. |

Table 1 is an intelligent recommendation table for medicines according to the embodiment of the present disclosure. The general sorting rules for medicines and the intelligent sorting rules for medicines listed in Table 1 are merely exemplary implementations of the sorting rules of virtual items in virtual scene, which does not mean that the sorting rules of virtual items in the virtual scene are merely the sorting rules listed in Table 1. Any rule that can sort virtual items in the virtual scene is within the scope of the embodiment, which is not described one by one by using an example.

The following describes the process of the method for medicine recommendation according to the embodiment of the present disclosure.

Figure 3:
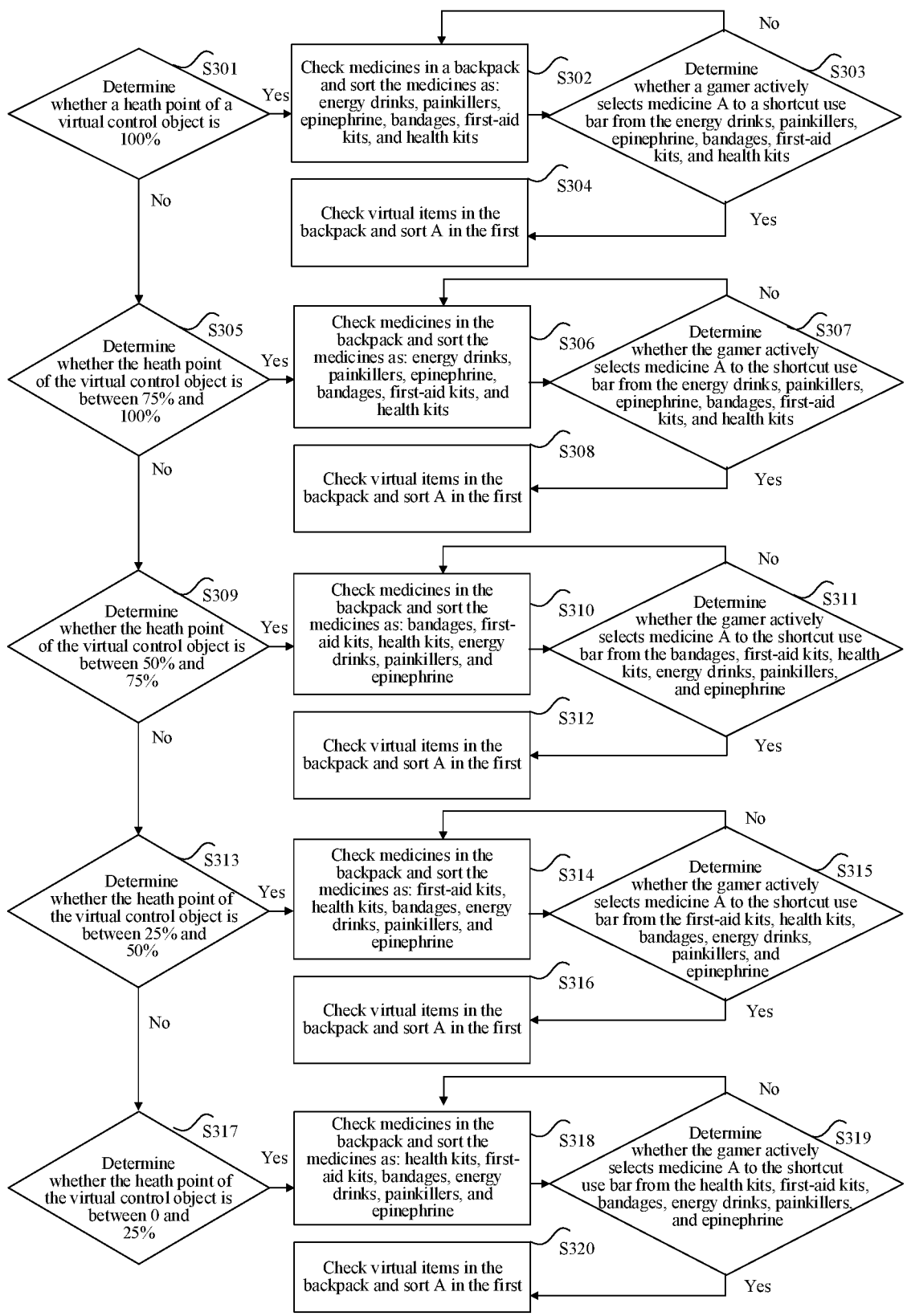
FIG. 3 is a flowchart of a method for recommending medicines according to an embodiment of the present disclosure.

FIG. 3 is a flowchart of a method for recommending medicines according to an embodiment of the present disclosure. As shown in FIG. 3, the method includes the following steps.

Step S301: Determine whether a heath point of a virtual control object is 100%.

It is determined whether the heath point of the virtual control object is 100%. If it is determined that the heath point of the virtual control object is 100%, step 302 is performed. If it is determined that the heath point of the virtual control object is not 100%, step S305 is performed.

Step S302: Check medicines in a backpack and sort the medicines as: energy drinks, painkillers, epinephrine, bandages, first-aid kits, and health kits.

After it is determined whether the heath point of the virtual control object is 100%, if it is determined that the heath point of the virtual control object is 100%, the medicines in the backpack are checked and sorted as: energy drinks, painkillers, epinephrine, bandages, first-aid kits, and health kits.

Step S303: Determine whether a gamer actively selects medicine A to a shortcut use bar from energy drinks, painkillers, epinephrine, bandages, first-aid kits, and health kits.

The medicines in the backpack are checked and sorted as: energy drinks, painkillers, epinephrine, bandages, first-aid kits, and health kits, and it is determined whether a gamer actively selects medicine A to the shortcut use bar from energy drinks, painkillers, epinephrine, bandages, first-aid kits, and health kits. If it is determined that the gamer actively selects medicine A to the shortcut use bar from energy drinks, painkillers, epinephrine, bandages, first-aid kits, and health kits, step S304 is performed. If not, step S302 is performed.

Step S304: Check virtual items in the backpack and sort A in the first.

After it is determined whether the gamer actively selects medicine A to the shortcut use bar from energy drinks, painkillers, epinephrine, bandages, first-aid kits, and health kits, if it is determined that the gamer actively selects medicine A to the shortcut use bar from energy drinks, painkillers, epinephrine, bandages, first-aid kits, and health kits, the virtual items in the backpack are checked, and A is sorted in the first.

Step S305: Determine whether the heath point of the virtual control object is between 75% and 100%.

After it is determined whether the heath point of the virtual control object is 100%, if it is determined that the heath point of the virtual control object is not 100%, it is determined whether the heath point of the virtual control object is between 75% and 100%. If it is determined that the heath point of the virtual control object is between 75% and 100%, step S306 is performed. If it is determined that the heath point of the virtual control object is not between 75% and 100%, step S309 is performed.

Step S306: Check medicines in the backpack and sort the medicines as: energy drinks, painkillers, epinephrine, bandages, first-aid kits, and health kits.

After it is determined whether the heath point of the virtual control object is between 75% and 100%, if it is determined that the heath point of the virtual control object is between 75% and 100%, the medicines in the backpack are checked and sorted as: energy drinks, painkillers, epinephrine, bandages, first-aid kits, and health kits.

Step S307: Determine whether the gamer actively selects medicine A to a shortcut use bar from energy drinks, painkillers, epinephrine, bandages, first-aid kits, and health kits.

The medicines in the backpack are checked and sorted as: energy drinks, painkillers, epinephrine, bandages, first-aid kits, and health kits, and it is determined whether a gamer actively selects medicine A to the shortcut use bar from energy drinks, painkillers, epinephrine, bandages, first-aid kits, and health kits. If it is determined that the gamer actively selects medicine A to the shortcut use bar from energy drinks, painkillers, epinephrine, bandages, first-aid kits, and health kits, step S308 is performed. If not, step S306 is performed.

Step S308: Check virtual items in the backpack and sort A in the first.

After it is determined whether the gamer actively selects medicine A to the shortcut use bar from energy drinks, painkillers, epinephrine, bandages, first-aid kits, and health kits, if it is determined that the gamer actively selects medicine A to the shortcut use bar from energy drinks, painkillers, epinephrine, bandages, first-aid kits, and health kits, the virtual items in the backpack are checked, and A is sorted in the first.

Step S309: Determine whether the heath point of the virtual control object is between 50% and 75%.

After it is determined whether the heath point of the virtual control object is between 75% and 100%, if it is determined that the heath point of the virtual control object is not between 75% and 100%, it is determined whether the heath point of the virtual control object is between 50% and 75%. If it is determined that the heath point of the virtual control object is between 50% and 75%, step S310 is performed. If it is determined that the heath point of the virtual control object is not between 50% and 75%, step S313 is performed.

Step S310: Check medicines in the backpack and sort the medicines as: bandages, first-aid kits, health kits, energy drinks, painkillers, and epinephrine.

After it is determined whether the heath point of the virtual control object is between 50% and 75%, if it is determined that the heath point of the virtual control object is between 50% and 75%, the medicines in the backpack are checked and sorted as: bandages, first-aid kits, health kits, energy drinks, painkillers, and epinephrine.

Step S311: Determine whether the gamer actively selects medicine A to the shortcut use bar from bandages, first-aid kits, health kits, energy drinks, painkillers, and epinephrine.

The medicines in the backpack are checked and sorted as: bandages, first-aid kits, health kits, energy drinks, painkillers, and epinephrine, and it is determined whether the gamer actively selects medicine A to the shortcut use bar from bandages, first-aid kits, health kits, energy drinks, painkillers, and epinephrine. If it is determined that the gamer actively selects medicine A to the shortcut use bar from bandages, first-aid kits, health kits, energy drinks, painkillers, and epinephrine, step S312 is performed. If not, step S310 is performed.

Step S312: Check virtual items in the backpack and sort A in the first.

After it is determined whether the gamer actively selects medicine A to the shortcut use bar from bandages, first-aid kits, health kits, energy drinks, painkillers, and epinephrine, if it is determined that the gamer actively selects medicine A to the shortcut use bar from bandages, first-aid kits, health kits, energy drinks, painkillers, and epinephrine, the virtual items in the backpack are checked, and A is sorted in the first.

Step S313: Determine whether the heath point of the virtual control object is between 25% and 50%.

After it is determined whether the heath point of the virtual control object is between 50% and 75%, if it is determined that the heath point of the virtual control object is not between 50% and 75%, it is determined whether the heath point of the virtual control object is between 25% and 50%. If it is determined that the heath point of the virtual control object is between 25% and 50%, step S314 is performed. If it is determined that the heath point of the virtual control object is not between 25% and 50%, step S317 is performed.

Step S314: Check medicines in the backpack and sort the medicines as: first-aid kits, health kits, bandages, energy drinks, painkillers, and epinephrine.

After it is determined whether the heath point of the virtual control object is between 25% and 50%, if it is determined that the heath point of the virtual control object is between 25% and 50%, the medicines in the backpack are checked and sorted as: first-aid kits, health kits, bandages, energy drinks, painkillers, and epinephrine.

Step S315: Determine whether the gamer actively selects medicine A to the shortcut use bar from first-aid kits, health kits, bandages, energy drinks, painkillers, and epinephrine.

The medicines in the backpack are checked and sorted as: first-aid kits, health kits, bandages, energy drinks, painkillers, and epinephrine, and it is determined whether the gamer actively selects medicine A to the shortcut use bar from first-aid kits, health kits, bandages, energy drinks, painkillers, and epinephrine. If it is determined that the gamer actively selects medicine A to the shortcut use bar from first-aid kits, health kits, bandages, energy drinks, painkillers, and epinephrine, step S316 is performed. If not, step S314 is performed.

Step S316: Check virtual items in the backpack and sort A in the first.

After it is determined whether the gamer actively selects medicine A to the shortcut use bar from first-aid kits, health kits, bandages, energy drinks, painkillers, and epinephrine, if it is determined that the gamer actively selects medicine A to the shortcut use bar from first-aid kits, health kits, bandages, energy drinks, painkillers, and epinephrine, the virtual items in the backpack are checked, and A is sorted in the first.

Step S317: Determine whether the heath point of the virtual control object is between 0 and 25%.

After it is determined whether the heath point of the virtual control object is between 25% and 50%, if it is determined that the heath point of the virtual control object is not between 25% and 50%, it is determined whether the heath point of the virtual control object is between 0% and 25%. If it is determined that the heath point of the virtual control object is between 0 and 25%, step S318 is performed.

Step S318: Check medicines in the backpack and sort the medicines as: health kits, first-aid kits, bandages, energy drinks, painkillers, and epinephrine.

After it is determined whether the heath point of the virtual control object is between 0% and 25%, if it is determined that the heath point of the virtual control object is between 0% and 25%, the medicines in the backpack are checked and sorted as: health kits, first-aid kits, bandages, energy drinks, painkillers, and epinephrine.

Step S319: Determine whether the gamer actively selects medicine A to the shortcut use bar from health kits, first-aid kits, bandages, energy drinks, painkillers, and epinephrine.

The medicines in the backpack are checked and sorted as: health kits, first-aid kits, bandages, energy drinks, painkillers, and epinephrine, and it is determined whether the gamer actively selects medicine A to the shortcut use bar from health kits, first-aid kits, bandages, energy drinks, painkillers, and epinephrine. If it is determined that the gamer actively selects medicine A to the shortcut use bar from health kits, first-aid kits, bandages, energy drinks, painkillers, and epinephrine, step S320 is performed. If not, step S318 is performed.

Step S320: Check virtual items in the backpack and sort A in the first.

After it is determined whether the gamer actively selects medicine A to the shortcut use bar from health kits, first-aid kits, bandages, energy drinks, painkillers, and epinephrine, if it is determined that the gamer actively selects medicine A to the shortcut use bar from bandages, first-aid kits, health kits, energy drinks, painkillers, and epinephrine, the virtual items in the backpack are checked, and A is sorted in the first.

In the solution, the most suitable virtual items are recommended for the game gamer in real time according to the current health point of the virtual control object corresponding to the game gamer, thereby simplifying use operations of the gamer on the items, so that the gamer can recover to the combat state as quickly as possible.

For the application environment in this embodiment of the present disclosure, reference may be made to, but not limited to, the application environment in the foregoing embodiment, and the details are not described herein again in this embodiment. The embodiments of the present disclosure provide an optional specific application used for implementing the foregoing item display method in the virtual scene.

In the embodiment, the virtual scene may be at least one shooting game scene, for example, an FPS game scene or a TPS game scene. In the game scene, the virtual control object corresponding to the gamer is provided with a wide variety of items for selection, so as to meet the requirements of the virtual control object corresponding to the gamer in different battle scenes.

Optionally, the system of the embodiment provides a total of six medicines including energy drinks, painkillers, epinephrine, bandages, first-aid kits, and health kits, which are classified according to recovery effects of the medicines. Different medicines have different designs in dimensions such as a recovery quantity, a validation duration, a recovery category, a use duration, and space occupation. For a novice gamer that has just entered the game, a wide variety of medicines provide sufficient strategies, but also bring a threshold for use. The gamer needs some time to get familiar with and skillfully use most of the medicines in the game to meet the requirements of the gamer in different scenes.

In addition, in the fierce battle scene in the game, it is still an urgent need to quickly and accurately locate the medicines that the gamer wants to use.

The intelligent medicine recommendation solution can resolve the foregoing problems. The following gives examples of scenes for the intelligent medicine recommendation solution of the embodiment.

Figure 4:
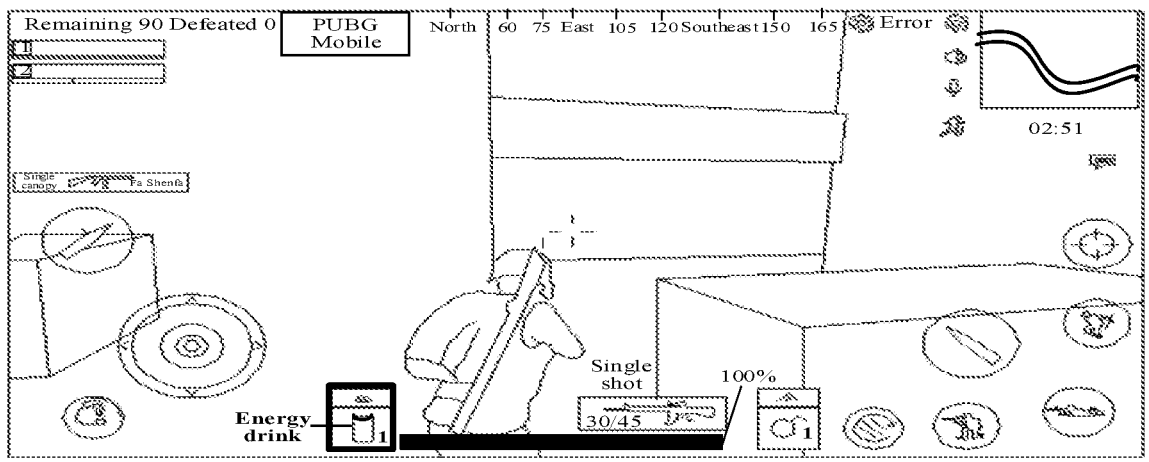
FIG. 4 is a schematic diagram of a scene I for item display according to an embodiment of the present disclosure.

FIG. 4 is a schematic diagram of a scene I for item display according to an embodiment of the present disclosure. As shown in FIG. 4, the virtual scene is a TPS scene. In the TPS scene, when health of a virtual control object corresponding to a gamer is full (100%), the gamer may arbitrarily select the medicine he/she wants to use to the shortcut use bar in a display area below the virtual scene, for example, select energy drinks to the shortcut use bar, and display a quantity of energy drinks in the shortcut use bar, for example, the quantity is 1.

Figure 5:
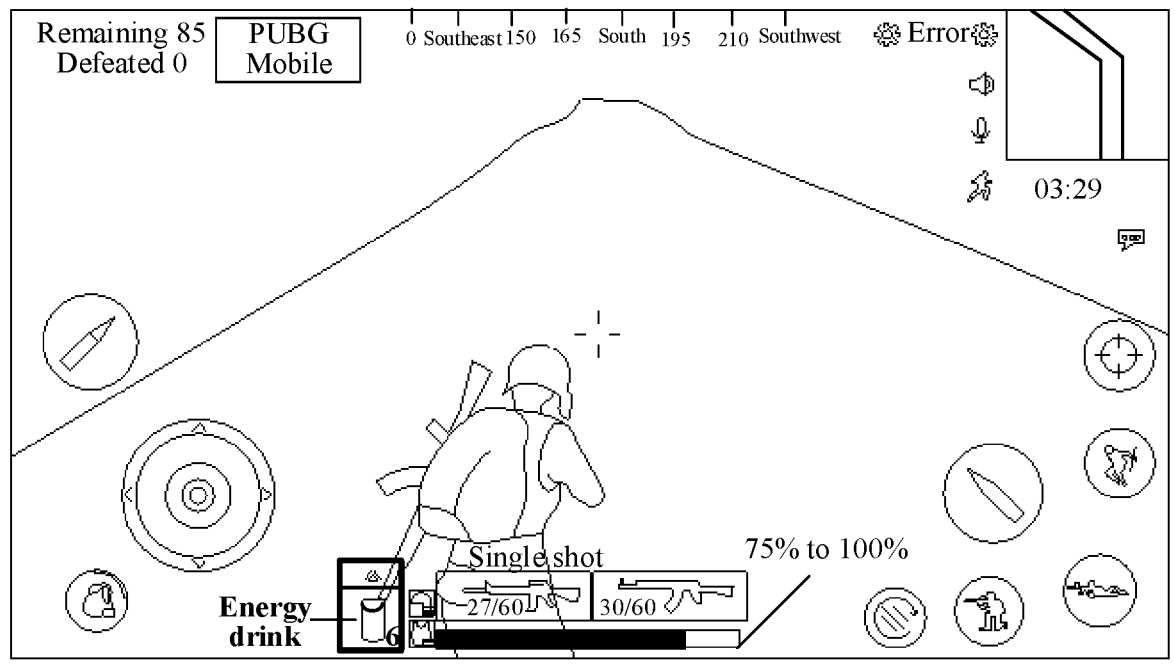
FIG. 5 is a schematic diagram of a scene II for item display according to an embodiment of the present disclosure.

FIG. 5 is a schematic diagram of a scene II for item display according to an embodiment of the present disclosure. As shown in FIG. 5, the virtual scene is a TPS scene. In the TPS scene, when a health point of a virtual control object corresponding to a gamer is between 75% and 100%, an optimal energy drink in a shortcut use bar is quickly recommended to the virtual control object corresponding to the gamer, and a quantity of energy drinks is displayed, for example, the quantity is 6, so that the virtual control object corresponding to the gamer can quickly use health replenishing medicine in the shortcut use bar.

Figure 6:
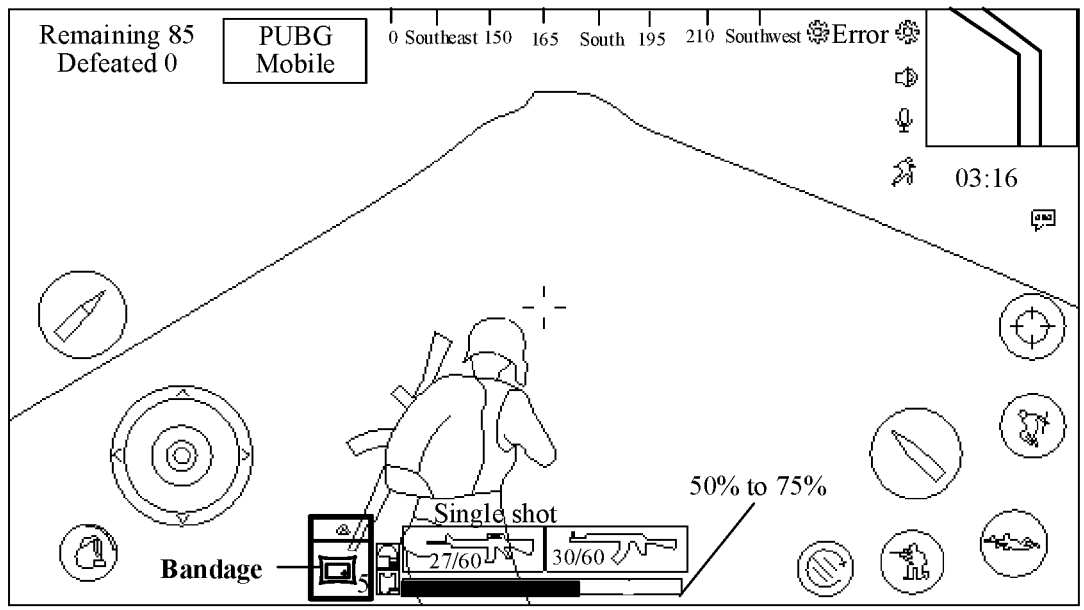
FIG. 6 is a schematic diagram of a scene III for item display according to an embodiment of the present disclosure.

FIG. 6 is a schematic diagram of a scene III for item display according to an embodiment of the present disclosure. As shown in FIG. 6, the virtual scene is a TPS scene. In the TPS scene, when a health point of a virtual control object corresponding to a gamer is between 50% and 75%, an optimal bandage in a shortcut use bar is quickly recommended to the virtual control object corresponding to the gamer, and a quantity of bandages is displayed, for example, the quantity is 5, so that the virtual control object corresponding to the gamer can replenish a small quantity of health points from the shortcut use bar repeatedly.

Figure 7:
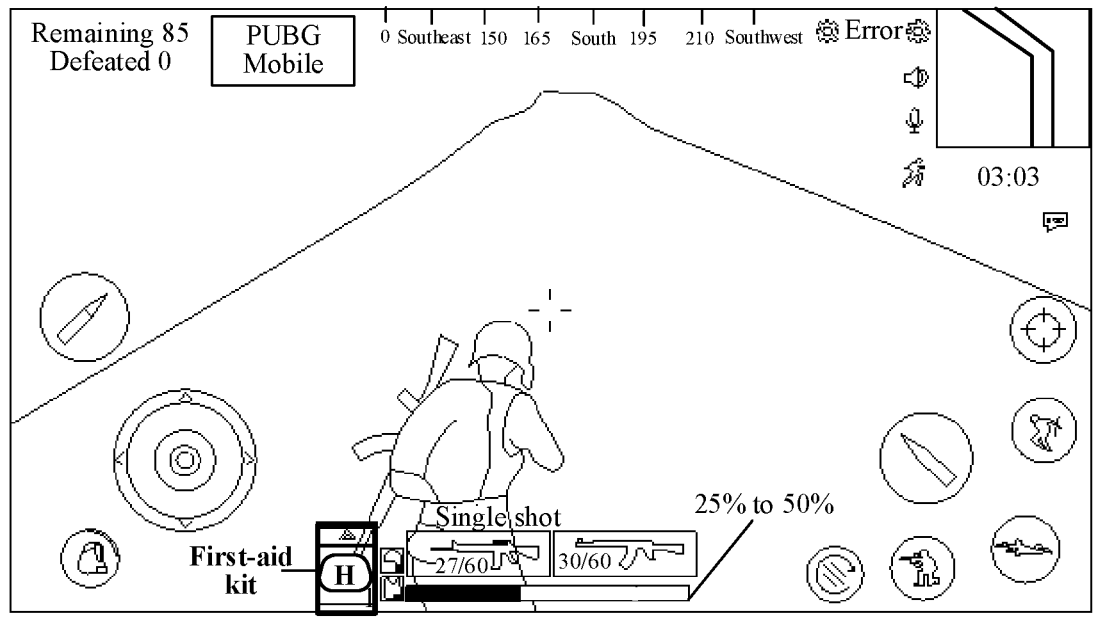
FIG. 7 is a schematic diagram of a scene IV for item display according to an embodiment of the present disclosure.

FIG. 7 is a schematic diagram of a scene IV for item display according to an embodiment of the present disclosure. As shown in FIG. 7, the virtual scene is a TPS scene. In the TPS scene, when a health point of a virtual control object corresponding to a gamer is between 25% and 50%, an optimal first-aid kit in a shortcut use bar is quickly recommended to the virtual control object corresponding to the gamer, and a quantity of first-aid kits is displayed, for example, the quantity is 1, so that the virtual control object corresponding to the gamer can replenish a relatively large quantity of health points from the shortcut use bar at a time.

Figure 8:
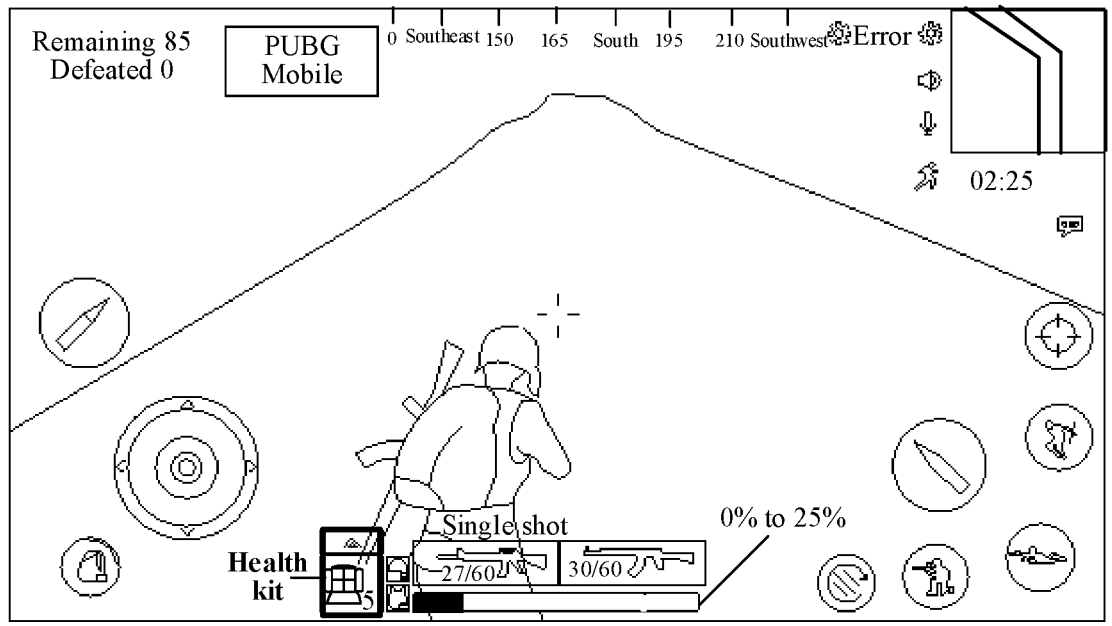
FIG. 8 is a schematic diagram of a scene V for item display according to an embodiment of the present disclosure.

FIG. 8 is a schematic diagram of a scene V for item display according to an embodiment of the present disclosure. As shown in FIG. 8, the virtual scene is a TPS scene. In the TPS scene, when a health point of a virtual control object corresponding to a gamer is between 0% and 25%, an optimal health kit in a shortcut use bar is quickly recommended to the virtual control object corresponding to the gamer, and a quantity of health kits is displayed, for example, the quantity is 5, so that the virtual control object corresponding to the gamer can replenish a large quantity of health points from the shortcut use bar at a time.

Figure 9:
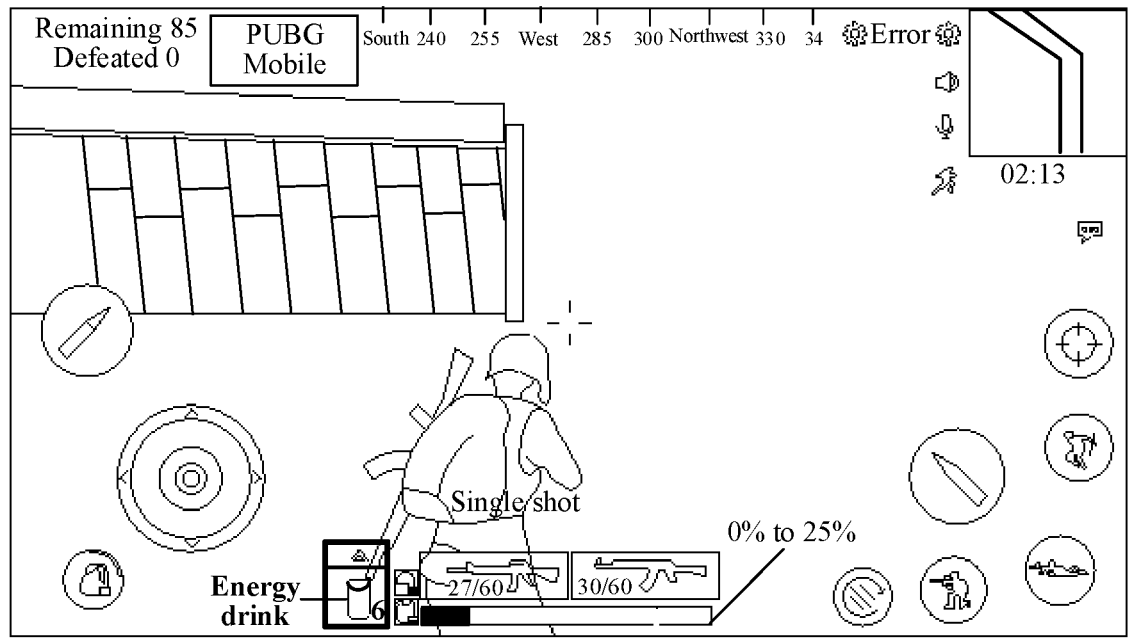
FIG. 9 is a schematic diagram of a scene VI for item display according to an embodiment of the present disclosure.

FIG. 9 is a schematic diagram of a scene VI for item display according to an embodiment of the present disclosure. As shown in FIG. 9, the virtual scene is a TPS scene. In the TPS scene, when a health point of a virtual control object corresponding to a gamer is between 0% and 25%, the gamer may still actively select, according to the current fight situation, the medicine that is required, for example, select energy drinks to use in a shortcut use bar, where there are six energy drinks. After the gamer actively selects the medicines he/she wants to use, the system will no longer recommend the optimal medicines to the gamer within 30 seconds, so that the choice of the gamer is respected while the demands of the gamer are being satisfied. After 30 seconds, the system may recommend the optimal medicine in the shortcut use bar to the virtual control object according to the health point of the virtual control object again.

The game scenes and the game products applied to the item display method in the virtual scene in the embodiments shown in FIG. 4 to FIG. 9 are merely examples of the embodiment of the present disclosure, which does not indicate that the game scenes and the game products applied in the embodiment of the present disclosure are merely limited to the game scenes and game products shown in FIG. 4 to FIG. 9. For example, the item display method may further be applied to an FPS scene, and may be applied to other game products such as a client game, a web game, a host game, and the like, which can be applied to a wide range of application scenes.

Optionally, in the embodiment, after starting the game, the gamer may manually set the preference and the priority order of the virtual items he/she needs, and may adjust frequency at which the optimal virtual items are recommended and a recommended cooling time after active selection.

Optionally, in the embodiment, through deep statistics and analysis of historical battle data of the virtual control object corresponding to the gamer, a preset model is trained by using the solution of machine deep learning to obtain a target model, and the target model is used for determining virtual items that the virtual control object corresponding to the gamer needs to use in the virtual scene. For example, the preset model is trained according to behavior data of the health point of the virtual control object at different thresholds in the past period of time and the virtual items that are used, to obtain a trained target model, and then the virtual items currently required by the virtual control object are determined by using behavior data of the current virtual control object and the target model, thereby achieving the purpose of determining the optimal virtual items to be displayed in the shortcut use bar, and improving the efficiency of displaying the items.

In the embodiment, in order to reduce the threshold for identifying the virtual items in the virtual scene by the gamer and meet the use requirements of the gamer for convenient items in complex combat situations, the most suitable virtual items are recommended for the gamer in real time according to the current health point of the virtual control object corresponding to the gamer, thereby simplifying use operations of the gamer on the items, so that the gamer can recover to the combat state as quickly as possible, and user experience is improved.

For brief description, the foregoing method embodiments are represented as a series of actions. However, it is to be appreciated by a person skilled in the art that the present disclosure is not limited to the described order of the actions, because some steps may be performed in other orders or simultaneously according to the present disclosure. In addition, it is to be appreciated by a person skilled in the art that the embodiments described in the specification all belong to exemplary embodiments, and the actions and modules are not necessary for the present disclosure.

Through the description of the foregoing implementations, a person skilled in the art may clearly understand that the method according to the foregoing embodiments may be implemented by means of software and a necessary general hardware platform, and may also be implemented by hardware, but in many cases, the former manner is a better implementation. Based on such understanding, the technical solutions of the present disclosure or a part thereof that makes a contribution to the related art may be essentially embodied in a form of a software product. The computer software product is stored in a storage medium (such as a ROM/RAM, a disk, and an optical disk), including several instructions to enable one terminal device (which may be a mobile phone, a computer, a server, a network device, or the like) to perform the methods in the embodiments of the present disclosure.

Figure 10:
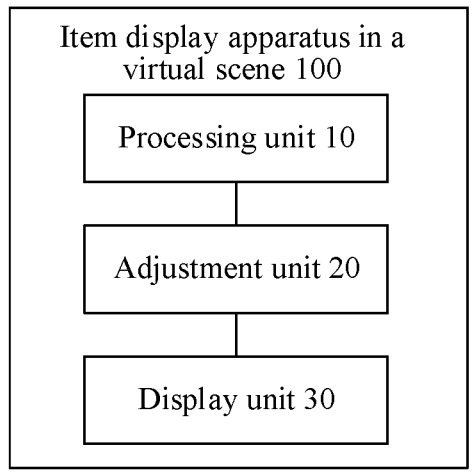
FIG. 10 is a schematic diagram of an item display apparatus in a virtual scene according to an embodiment of the present disclosure.

According to another aspect of the embodiments of the present disclosure, an item display apparatus in a virtual scene for implementing the foregoing item display method in the virtual scene is further provided, including one or more processors and one or more memories storing a program unit, the program unit being executed by the processor and including a processing unit, an adjustment unit, and a display unit. FIG. 10 is a schematic diagram of an item display apparatus in a virtual scene according to an embodiment of the present disclosure. As shown in FIG. 10, an item display apparatus 100 in the virtual scene may include: a processing unit 10, an adjustment unit 20, and a display unit 30.

The processing unit 10 is configured to cause a terminal to control, in response to a first target operation instruction generated by a first target operation, a virtual control object in a virtual scene displayed by a client to acquire a plurality of virtual items, the virtual item being configured to increase an attribute value of the virtual control object.

The adjustment unit 20 is configured to cause the terminal to adjust, according to behavior of the virtual control object in the virtual scene, the attribute value of the virtual control object.

The display unit 30 is configured to cause the terminal to display, in the virtual scene of the client, an identifier of a first virtual item matching a target condition in the plurality of virtual items in a case that the adjusted attribute value meets the target condition, the identifier of the first virtual item being for being selected for use in the virtual scene.

The processing unit 10 in the embodiment may be configured to perform step S202 in the embodiment of this application, the adjustment unit 20 in the embodiment may be configured to perform step S204 in the embodiment of this application, and the display unit 30 in the embodiment may be configured to perform step S206 in the embodiment of this application.

The processing unit 10, the adjustment unit 20, and the display unit 30 may be run in the terminal as a part of the apparatus, and functions implemented by the foregoing units may be executed by using the processor in the terminal. The terminal may also be a terminal device such as a smartphone (such as an Android phone, an iPhone, and the like), a tablet computer, a palm computer, a mobile Internet device (MID), a PAD, and the like.

In the embodiment, the processing unit 10 is used for causing the terminal to control, in response to the first target operation instruction generated by the first target operation, the virtual control object in the virtual scene displayed by the client to acquire a plurality of virtual items. The virtual item is used for increasing the attribute value of the virtual control object, and the adjustment unit 20 is used for causing the terminal to adjust the attribute value of the virtual control object according to the behavior of the virtual control object in the virtual scene. The display unit 30 is used for causing the terminal to display, in the virtual scene of the client, an identifier of the first virtual item matching a target condition in the plurality of virtual items in a case that the adjusted attribute value meets the target condition, the identifier of the first virtual item being for being selected for use in the virtual scene. In other words, the first virtual item matching the target condition satisfied by the adjusted attribute value is automatically selected, according to the adjusted attribute value of the virtual control object, from the plurality of virtual items that have been acquired by the virtual control object, so that the first virtual item is displayed in the virtual scene, and a gamer does not need to adjust the virtual items in the item list in real time, finds and uses the required virtual items from a plurality of virtual items, thereby achieving the purpose of intelligently recommending virtual items in the virtual scene, so that the first virtual item that matches the adjusted attribute value of the virtual control object can be quickly and accurately located, and the technical effect of improving the efficiency of displaying the item is achieved, thereby resolving the technical problem of low efficiency of displaying the item in the related art.

The foregoing units are the same as the example and the application scene implemented by the corresponding steps, but are not limited to the content disclosed in the foregoing embodiments. As a part of the apparatus, the foregoing module may be run in the hardware environment shown in FIG. 1, and may be implemented by software or hardware, where the hardware environment includes a network environment.

According to still another aspect of the embodiments of the present disclosure, an electronic device used for implementing the item display method in the virtual scene is further provided.

Figure 11:
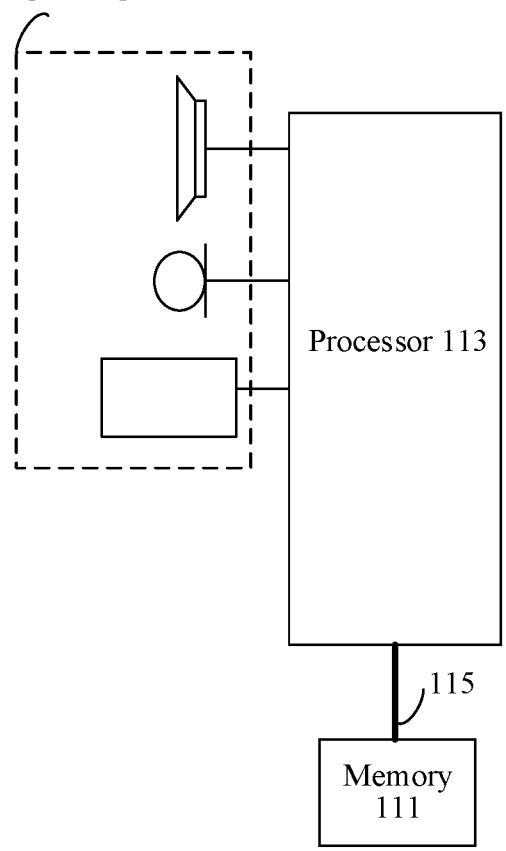
FIG. 11 is a structural block diagram of an electronic device according to an embodiment of the present disclosure.

FIG. 11 is a structural block diagram of an electronic device according to an embodiment of the present disclosure. As shown in FIG. 11, the electronic device may include: a memory 111 and one or more (only one is shown) processors 113, the memory 111 storing a computer program, and the processor 113 may be configured to run the computer program to perform the data processing method of the embodiment of the present disclosure.

The memory 111 may be configured to store a software program and a module, such as a program instruction/module corresponding to the item display method and apparatus in a virtual scene in the embodiment of the present disclosure. The processor 113 executes various functional applications and data processing by running the software program and the module that are stored in the memory 111, to implement the foregoing item display method in the virtual scene. The memory 111 may include a high-speed random access memory, and may further include a non-volatile memory, for example, one or more magnetic storage apparatuses, flash memories, or other non-volatile solid state memories. In some embodiments, the memory 111 may further include memories that are remotely disposed relative to the processor 113, and these remote memories may be connected to a terminal via a network. Examples of the foregoing network include, but are not limited to, an Internet, an intranet, a local area network, a mobile communication network, and a combination thereof.

Optionally, as shown in FIG. 11, the electronic device may further include: a transmission apparatus 115 and an input/output device 117. The transmission apparatus 115 is configured to receive or send data via a network. A specific example of the foregoing network may include a wired network and a wireless network. In an example, the transmission apparatus 115 includes a network interface controller (NIC), and the network interface card may be connected to another network device and a router via a network cable to communicate with the Internet or a local area network. In an example, the transmission apparatus 115 is a radio frequency (RF) module, which is configured to communicate with the Internet in a wireless manner.

Optionally, the memory 111 is configured to store an application program.

The processor 113 may be configured to invoke the computer program stored in the memory 111 by using the transmission apparatus 115 to perform the following operations:

controlling, by a terminal in response to a first target operation instruction generated by a first target operation, a virtual control object in a virtual scene displayed by a client to acquire a plurality of virtual items, the virtual item being configured to increase an attribute value of the virtual control object;

adjusting, by the terminal, the attribute value of the virtual control object according to behavior of the virtual control object in the virtual scene; and displaying, by the terminal in the virtual scene of the client, an identifier of a first virtual item matching a target condition in the plurality of virtual items in a case that the adjusted attribute value meets the target condition, the identifier of the first virtual item being for being selected for use in the virtual scene.

The processor 113 is further configured to perform the following operations: displaying, by the terminal in the virtual scene of the client, an identifier of the first virtual item matching a target value interval in the plurality of virtual items in a case that the adjusted attribute value is in the target value interval corresponding to the target condition, different preset value intervals matching different virtual items, the different value intervals including the target value interval, and the different virtual items including the first virtual item.

The processor 113 is further configured to perform the following operations: detecting, by the terminal in the virtual scene of the client after displaying an identifier of the first virtual item matching the target condition in the plurality of virtual items, an item adjustment instruction on the client; and adjusting, by the terminal in response to the item adjustment instruction, the identifier of the first virtual item displayed in the virtual scene of the client to an identifier of a second virtual item in the plurality of virtual items, the identifier of the second virtual item being for being selected for use in the virtual scene.

The processor 113 is further configured to perform the following operations: detecting, by the terminal, the item adjustment instruction on the client in a case that the target value interval of the adjusted attribute value is a preset value interval.

The processor 113 is further configured to perform the following operations: forbidding displaying, by the terminal during a target time after adjusting the identifier of the first virtual item displayed in the virtual scene of the client to an identifier of a second virtual item in the plurality of virtual items, the identifier of the first virtual item in the virtual scene of the client, the target time being a period of time during which the identifier of the first virtual item displayed in the virtual scene is adjusted to the identifier of the second virtual item.

The processor 113 is further configured to perform the following operations: setting, by the terminal, the target time in response to a second target operation instruction generated by a second target operation.

The processor 113 is further configured to perform the following operations: sorting, by the terminal, a plurality of virtual items according to a target arrangement order matching a target value interval in a case that the adjusted attribute value is in the target value interval corresponding to the target condition, different preset value intervals matching different arrangement orders, the different value intervals including the target value interval, and the different arrangement orders including the target arrangement order; and displaying, by the terminal in the virtual scene of the client, the identifier of the first virtual item matching the target value interval in the plurality of sorted virtual items.

The processor 113 is further configured to perform the following operations: determining, by the terminal according to the target value interval in a case that the adjusted attribute value is in the target value interval corresponding to the target condition, a priority order in which the plurality of virtual items are respectively for being used in combination with the virtual control object in the virtual scene, the target arrangement order including the priority order; and sorting, by the terminal, the plurality of virtual items according to the priority order. The displaying, by the terminal in the virtual scene of the client, the identifier of the first virtual item matching the target value interval in the plurality of sorted virtual items includes: determining, by the terminal, a virtual item in the first priority in the priority order in the plurality of sorted virtual items as the first virtual item, and displaying the identifier of the first virtual item in the virtual scene of the client, the first priority being used for indicating that the first virtual item has priority over virtual items other than the first virtual item in the plurality of virtual items, and the virtual item being for being used in combination with the virtual control object in the virtual scene.

The processor 113 is further configured to perform the following operations: determining, by the terminal according to a target value interval and information about the plurality of virtual items in a case that the adjusted attribute value is in the target value interval corresponding to the target condition, a priority order in which the plurality of virtual items are respectively for being used in combination with the virtual control object in the virtual scene.

The processor 113 is further configured to perform at least one of the following steps before acquiring the attribute value of the virtual control object in the virtual scene displayed by the client. The terminal sorts the plurality of virtual items in response to a third target operation instruction generated by a third target operation. The terminal displays, in the virtual scene in response to a fourth target operation instruction generated by a fourth target operation, an identifier of a third virtual item selected from the plurality of sorted virtual items, the identifier of the third virtual item being for being selected for use in the virtual scene. setting, by the terminal in response to a fifth target operation instruction generated by a fifth target operation, frequency at which the identifier of the first virtual item matching the target condition in the plurality of virtual items is displayed in the virtual scene of the client.

The processor 113 is further configured to perform the following operations: acquiring, by the terminal before displaying the identifier of the first virtual item matching the target condition in the plurality of virtual items in the virtual scene of the client, a historical attribute value of the virtual control object in the virtual scene in a past time period and a virtual item for being used in combination with virtual control object in the past time period; training, by the terminal, a preset model by using the historical attribute value and the virtual item for being used in combination with the virtual control object in the past time period, to obtain a trained target model; and determining, by the terminal by using the target model and the current adjusted attribute value of the virtual control object in the virtual scene, the first virtual item matching the target condition.

The processor 113 is further configured to perform the following operations: controlling, by the terminal in response to the first target operation instruction generated by the first target operation, virtual attack equipment in a virtual scene displayed by a shooting game client to acquire a plurality of pieces of virtual attack accessory equipment, the virtual attack accessory equipment being configured to increase an attribute value of the virtual attack equipment, the client including the shooting game client, the virtual control object including the virtual attack equipment, and the virtual item including the virtual attack accessory equipment; adjusting, by the terminal, the attribute value of the virtual attack equipment according to behavior of the virtual attack equipment in the virtual scene; and displaying, by the terminal in the virtual scene of the shooting game client, an identifier of first virtual attack accessory equipment matching the target condition in the plurality of pieces of virtual attack accessory equipment in a case that the adjusted attribute value meets the target condition.

According to the embodiments of the present disclosure, an item display method in a virtual scene is provided. A terminal controls, in response to a first target operation instruction generated by a first target operation, a virtual control object in a virtual scene displayed by a client to acquire a plurality of virtual items, the virtual item being configured to increase an attribute value of the virtual control object. The terminal adjusts the attribute value of the virtual control object according to behavior of the virtual control object in the virtual scene. The terminal displays, in the virtual scene of the client, an identifier of the first virtual item matching a target condition in the plurality of virtual items in a case that the adjusted attribute value meets the target condition, the identifier of the first virtual item being for being selected for use in the virtual scene. In other words, the first virtual item matching the target condition satisfied by the adjusted attribute value is automatically selected, according to the adjusted attribute value of the virtual control object, from the plurality of virtual items that have been acquired by the virtual control object, so that the first virtual item is displayed in the virtual scene, and a gamer does not need to adjust the virtual items in the item list in real time, finds and uses the required virtual items from a plurality of virtual items, thereby achieving the purpose of intelligently recommending virtual items in the virtual scene, so that the first virtual item that matches the adjusted attribute value of the virtual control object can be quickly and accurately located, and the technical effect of improving the efficiency of displaying the item is achieved, thereby resolving the technical problem of low efficiency of displaying the item in the related art.

Optionally, for a specific example in this embodiment, reference may be made to the example described in the foregoing embodiment, and details are not described herein again in this embodiment.

Optionally, a person skilled in the art may understand that the structure shown in FIG. 11 is merely an example, and the electronic device may also be a terminal device such as a smartphone (such as an Android mobile phone, an iPhone, or the like), a tablet computer, a palmtop computer, a mobile Internet device (MID), a PAD, or the like. FIG. 11 does not constitute a limitation on the structure of the foregoing electronic device. For example, the electronic device may further include more or few components (such as a network interface, a display apparatus, or the like) than those shown in FIG. 11, or has a configuration different from that shown in FIG. 11.

The embodiments of the present disclosure further provide a storage medium. Optionally, in this embodiment, the storage medium stores a computer program, the computer program, when being run, being configured to perform the step in the foregoing any one of the method embodiments.

Optionally, in this embodiment, the storage medium may be located on at least one of a plurality of network devices in the network described in the foregoing embodiment.

Optionally, in this embodiment, the storage medium is configured to store program code for performing the following steps:

controlling, by a terminal in response to a first target operation instruction generated by a first target operation, a virtual control object in a virtual scene displayed by a client to acquire a plurality of virtual items, the virtual item being configured to increase an attribute value of the virtual control object;

adjusting, by the terminal, the attribute value of the virtual control object according to behavior of the virtual control object in the virtual scene; and displaying, by the terminal in the virtual scene of the client, an identifier of a first virtual item matching a target condition in the plurality of virtual items in a case that the adjusted attribute value meets the target condition, the identifier of the first virtual item being for being selected for use in the virtual scene.

Optionally, the storage medium is further configured to store program code for performing the following steps: displaying, by the terminal in the virtual scene of the client, an identifier of the first virtual item matching a target value interval in the plurality of virtual items in a case that the adjusted attribute value is in the target value interval corresponding to the target condition, different preset value intervals matching different virtual items, the different value intervals including the target value interval, and the different virtual items including the first virtual item.

Optionally, the storage medium is further configured to store program code for performing the following steps: detecting, by the terminal in the virtual scene of the client after displaying an identifier of the first virtual item matching the target condition in the plurality of virtual items, an item adjustment instruction on the client; and adjusting, by the terminal in response to the item adjustment instruction, the identifier of the first virtual item displayed in the virtual scene of the client to an identifier of a second virtual item in the plurality of virtual items, the identifier of the second virtual item being for being selected for use in the virtual scene.

Optionally, the storage medium is further configured to store program code for performing the following steps: detecting, by the terminal, the item adjustment instruction on the client in a case that the target value interval of the adjusted attribute value is a preset value interval.

Optionally, the storage medium is further configured to store program code for performing the following steps: forbidding displaying, by the terminal during a target time after adjusting the identifier of the first virtual item displayed in the virtual scene of the client to an identifier of a second virtual item in the plurality of virtual items, the identifier of the first virtual item in the virtual scene of the client, the target time being a period of time during which the identifier of the first virtual item displayed in the virtual scene is adjusted to the identifier of the second virtual item.

Optionally, the storage medium is further configured to store program code for performing the following steps: setting, by the terminal, the target time in response to a second target operation instruction generated by a second target operation.

Optionally, the storage medium is further configured to store program code for performing the following steps: sorting, by the terminal, a plurality of virtual items according to a target arrangement order matching a target value interval in a case that the adjusted attribute value is in the target value interval corresponding to the target condition, different preset value intervals matching different arrangement orders, the different value intervals including the target value interval, and the different arrangement orders including the target arrangement order; and displaying, by the terminal in the virtual scene of the client, the identifier of the first virtual item matching the target value interval in the plurality of sorted virtual items.

Optionally, the storage medium is further configured to store program code for performing the following steps: determining, by the terminal according to the target value interval in a case that the adjusted attribute value is in the target value interval corresponding to the target condition, a priority order in which the plurality of virtual items are respectively for being used in combination with the virtual control object in the virtual scene, the target arrangement order including the priority order; and sorting, by the terminal, the plurality of virtual items according to the priority order. The displaying, by the terminal in the virtual scene of the client, the identifier of the first virtual item matching the target value interval in the plurality of sorted virtual items includes: determining, by the terminal, a virtual item in the first priority in the priority order in the plurality of sorted virtual items as the first virtual item, and displaying the identifier of the first virtual item in the virtual scene of the client, the first priority being used for indicating that the first virtual item has priority over virtual items other than the first virtual item in the plurality of virtual items, and the virtual item being for being used in combination with the virtual control object in the virtual scene.

Optionally, the storage medium is further configured to store program code for performing the following steps: determining, by the terminal according to a target value interval and information about the plurality of virtual items in a case that the adjusted attribute value is in the target value interval corresponding to the target condition, a priority order in which the plurality of virtual items are respectively for being used in combination with the virtual control object in the virtual scene.

Optionally, the storage medium is further configured to store the program code for performing at least one of the following steps before acquiring the attribute value of the virtual control object in the virtual scene displayed by the client. The terminal sorts the plurality of virtual items in response to a third target operation instruction generated by a third target operation. The terminal displays, in the virtual scene in response to a fourth target operation instruction generated by a fourth target operation, an identifier of a third virtual item selected from the plurality of sorted virtual items, the identifier of the third virtual item being for being selected for use in the virtual scene. The terminal sets, in response to a fifth target operation instruction generated by a fifth target operation, frequency at which the identifier of the first virtual item matching the target condition in the plurality of virtual items is displayed in the virtual scene of the client.

Optionally, the storage medium is further configured to store program code for performing the following steps: acquiring, by the terminal before displaying the identifier of the first virtual item matching the target condition in the plurality of virtual items in the virtual scene of the client, a historical attribute value of the virtual control object in the virtual scene in a past time period and a virtual item for being used in combination with virtual control object in the past time period; training, by the terminal, a preset model by using the historical attribute value and the virtual item for being used in combination with the virtual control object in the past time period, to obtain a trained target model; and determining, by the terminal by using the target model and the current adjusted attribute value of the virtual control object in the virtual scene, the first virtual item matching the target condition.

Optionally, the storage medium is further configured to store program code for performing the following steps: controlling, by the terminal in response to the first target operation instruction generated by the first target operation, virtual attack equipment in a virtual scene displayed by a shooting game client to acquire a plurality of pieces of virtual attack accessory equipment, the virtual attack accessory equipment being configured to increase an attribute value of the virtual attack equipment, the client including the shooting game client, the virtual control object including the virtual attack equipment, and the virtual item including the virtual attack accessory equipment; adjusting, by the terminal, the attribute value of the virtual attack equipment according to behavior of the virtual attack equipment in the virtual scene; and displaying, by the terminal in the virtual scene of the shooting game client, an identifier of the first virtual attack accessory equipment matching the target condition in the plurality of pieces of virtual attack accessory equipment in a case that the adjusted attribute value meets the target condition.

Optionally, for a specific example in this embodiment, refer to the examples described in the foregoing embodiments, and details are not described herein again in this embodiment.

Optionally, in this embodiment, the storage medium may include but is not limited to: any medium that can store program code, such as a USB flash drive, a read-only memory (ROM), a random access memory (RAM), a removable hard disk, a magnetic disk, or an optical disc that can store the program code.

The item display method and apparatus in a virtual scene and the storage medium according to the embodiments of the present disclosure are described above with reference to the accompanying drawings by way of example. However, a person skilled in the art is to understand that various improvements can further be made to the item display method and apparatus in a virtual scene and the storage medium provided in the embodiments of the present disclosure without departing from the content of the present disclosure. Therefore, the protection scope of the embodiments of the present disclosure is to be subject to the content of the appended claims.

The sequence numbers of the embodiments of the present disclosure are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of the present disclosure essentially, or the part contributing to the related technology, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present invention.

In the foregoing embodiments of the present disclosure, the descriptions of the embodiments have respective focuses. For the part that is not detailed in an embodiment, refer to the relevant description of other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The foregoing descriptions are merely exemplary implementations of the present disclosure. A person of ordinary skill in the art may make several improvements or polishing without departing from the principle of the present disclosure, and the improvements or polishing shall fall within the protection scope of the present disclosure.

INDUSTRIAL APPLICABILITY

In the embodiment of the present disclosure, the terminal controls, in response to the first target operation instruction generated by the first target operation, the virtual control object in the virtual scene displayed by the client to acquire the plurality of virtual items, the virtual item being configured to increase an attribute value of the virtual control object. The terminal adjusts the attribute value of the virtual control object according to behavior of the virtual control object in the virtual scene. The terminal displays, in the virtual scene of the client, an identifier of the first virtual item matching a target condition in the plurality of virtual items in a case that the adjusted attribute value meets the target condition, the identifier of the first virtual item being for being selected for use in the virtual scene. In other words, the first virtual item matching the target condition satisfied by the adjusted attribute value is automatically selected, according to the adjusted attribute value of the virtual control object, from the plurality of virtual items that have been acquired by the virtual control object, so that the first virtual item is displayed in the virtual scene, and a gamer does not need to adjust the virtual items in the item list in real time, finds and uses the required virtual items from a plurality of virtual items, thereby achieving the purpose of intelligently recommending virtual items in the virtual scene, so that the first virtual item that matches the adjusted attribute value of the virtual control object can be quickly and accurately located, and the technical effect of improving the efficiency of displaying the item is achieved, thereby resolving the technical problem of low efficiency of displaying the item in the related art.

What is claimed is:
1. An item display method in a virtual scene, the method comprising:
controlling, by a terminal in response to a first target operation instruction generated by a user of the terminal, a virtual control object in a virtual scene displayed by a client running at the terminal to acquire a plurality of virtual items, each of the plurality of virtual items being configured to increase an attribute value of the virtual control object;

adjusting, by the terminal, the attribute value of the virtual control object according to current behavior of the virtual control object in the virtual scene;

acquiring, by the terminal, a historical attribute value of the virtual control object in the virtual scene in a past time period and a virtual item used in combination with the virtual control object in the past time period;

training, by the terminal, a preset model using the historical attribute value and the virtual item used in combination with the historical virtual control object in the past time period, to obtain a trained target model; and determining, by the terminal using the trained target model and the current adjusted attribute value of the virtual control object in the virtual scene, that a first virtual item of the plurality of virtual items matches a target condition in the plurality of virtual items when the adjusted attribute value meets the target condition; and displaying, by the terminal in the virtual scene of the client, an identifier of the first virtual item, the identifier of the first virtual item being configured for use in the virtual scene.

2. The method according to claim 1, wherein the displaying, by the terminal in the virtual scene of the client, an identifier of a first virtual item matching a target condition in the plurality of virtual items when that the adjusted attribute value meets the target condition comprises:

displaying, by the terminal in the virtual scene of the client, an identifier of the first virtual item matching a target value interval in the plurality of virtual items when the adjusted attribute value is in the target value interval corresponding to the target condition, different preset value intervals matching different virtual items, the different value intervals comprising the target value interval, and the different virtual items comprising the first virtual item.

3. The method according to claim 1, wherein a smaller adjusted attribute value or a smaller boundary value of the target value interval of the adjusted attribute value leads to a larger value that is added by the first virtual item to the attribute value of the virtual control object.

4. The method according to claim 1, wherein after the displaying, by the terminal in the virtual scene of the client, an identifier of the first virtual item matching the target condition in the plurality of virtual items, the method further comprises:

detecting, by the terminal, an item adjustment instruction on the client by the user of the terminal; and adjusting, by the terminal in response to the item adjustment instruction, the identifier of the first virtual item displayed in the virtual scene of the client as an identifier of a second virtual item in the plurality of virtual items, the identifier of the second virtual item being for being selected for use in the virtual scene.

5. The method according to claim 4, wherein the detecting, by the terminal, an item adjustment instruction on the client comprises:

detecting, by the terminal, the item adjustment instruction on the client when the target value interval of the adjusted attribute value is a preset value interval.

6. The method according to claim 1, wherein the displaying, by the terminal in the virtual scene of the client, an identifier of a first virtual item matching a target condition in the plurality of virtual items when the adjusted attribute value meets the target condition comprises:

sorting, by the terminal, a plurality of virtual items according to a target arrangement order matching a target value interval when the adjusted attribute value is in the target value interval corresponding to the target condition, different preset value intervals matching different arrangement orders, the different value intervals comprising the target value interval, and the different arrangement orders comprising the target arrangement order; and displaying, by the terminal in the virtual scene of the client, the identifier of the first virtual item matching the target value interval in the plurality of sorted virtual items.

7. The method according to claim 1, wherein before the displaying, by the terminal in the virtual scene of the client, an identifier of a first virtual item matching a target condition in the plurality of virtual items, the method further comprises at least one of the following:

sorting, by the terminal, the plurality of virtual items in response to a third target operation instruction generated by a third target operation;

displaying, in the virtual scene, by the terminal in response to a fourth target operation instruction generated by a fourth target operation, an identifier of a third virtual item selected from the plurality of sorted virtual items, the identifier of the third virtual item being for being selected for use in the virtual scene; and setting, by the terminal in response to a fifth target operation instruction generated by a fifth target operation, frequency at which the identifier of the first virtual item matching the target condition in the plurality of virtual items is displayed in the virtual scene of the client.

8. The method according to claim 1, wherein the controlling, by a terminal in response to a first target operation instruction generated by a first target operation, a virtual control object in a virtual scene displayed by a client to acquire a plurality of virtual items comprises: controlling, by the terminal in response to the first target operation instruction generated by the first target operation, virtual attack equipment in a virtual scene displayed by a shooting game client to acquire a plurality of pieces of virtual attack accessory equipment, the virtual attack accessory equipment being configured to increase an attribute value of the virtual attack equipment, the client comprising the shooting game client, the virtual control object comprising the virtual attack equipment, and the virtual item comprising the virtual attack accessory equipment;

the adjusting, by the terminal, the attribute value of the virtual control object according to behavior of the virtual control object in the virtual scene comprises: adjusting, by the terminal, the attribute value of the virtual attack equipment according to behavior of the virtual attack equipment in the virtual scene; and the displaying, by the terminal in the virtual scene of the client, an identifier of a first virtual item matching a target condition in the plurality of virtual items when the adjusted attribute value meets the target condition comprises: displaying, by the terminal in the virtual scene of the shooting game client, an identifier of first virtual attack accessory equipment matching the target condition in the plurality of pieces of virtual attack accessory equipment when the adjusted attribute value meets the target condition.

9. A terminal, comprising a memory and a processor, the memory storing a plurality of computer programs, and the processor being configured to run the computer programs to perform a plurality of operations including:

controlling, by a terminal in response to a first target operation instruction generated by a user of the terminal, a virtual control object in a virtual scene displayed by a client running at the terminal to acquire a plurality of virtual items, each of the plurality of virtual items being configured to increase an attribute value of the virtual control object;

adjusting, by the terminal, the attribute value of the virtual control object according to current behavior of the virtual control object in the virtual scene; and acquiring, by the terminal, a historical attribute value of the virtual control object in the virtual scene in a past time period and a virtual item used in combination with the virtual control object in the past time period;

training, by the terminal, a preset model using the historical attribute value and the virtual item used in combination with the historical virtual control object in the past time period, to obtain a trained target model; and determining, by the terminal using the trained target model and the current adjusted attribute value of the virtual control object in the virtual scene, that a first virtual item of the plurality of virtual items matches a target condition in the plurality of virtual items when the adjusted attribute value meets the target condition; and displaying, by the terminal in the virtual scene of the client, an identifier of the first virtual item, the identifier of the first virtual item being configured for use in the virtual scene.

10. The terminal according to claim 9, wherein the displaying, by the terminal in the virtual scene of the client, an identifier of a first virtual item matching a target condition in the plurality of virtual items when the adjusted attribute value meets the target condition comprises:

displaying, by the terminal in the virtual scene of the client, an identifier of the first virtual item matching a target value interval in the plurality of virtual items when the adjusted attribute value is in the target value interval corresponding to the target condition, different preset value intervals matching different virtual items, the different value intervals comprising the target value interval, and the different virtual items comprising the first virtual item.

11. The terminal according to claim 9, wherein a smaller adjusted attribute value or a smaller boundary value of the target value interval of the adjusted attribute value leads to a larger value that is added by the first virtual item to the attribute value of the virtual control object.

12. The terminal according to claim 9, wherein the plurality of operations further comprise:

after displaying, by the terminal in the virtual scene of the client, an identifier of the first virtual item matching the target condition in the plurality of virtual items:

detecting, by the terminal, an item adjustment instruction on the client by the user of the terminal; and adjusting, by the terminal in response to the item adjustment instruction, the identifier of the first virtual item displayed in the virtual scene of the client as an identifier of a second virtual item in the plurality of virtual items, the identifier of the second virtual item being for being selected for use in the virtual scene.

13. The terminal according to claim 9, wherein the displaying, by the terminal in the virtual scene of the client, an identifier of a first virtual item matching a target condition in the plurality of virtual items when the adjusted attribute value meets the target condition comprises:

sorting, by the terminal, a plurality of virtual items according to a target arrangement order matching a target value interval when the adjusted attribute value is in the target value interval corresponding to the target condition, different preset value intervals matching different arrangement orders, the different value intervals comprising the target value interval, and the different arrangement orders comprising the target arrangement order; and displaying, by the terminal in the virtual scene of the client, the identifier of the first virtual item matching the target value interval in the plurality of sorted virtual items.

14. The terminal according to claim 9, wherein the plurality of operations further comprise at least one of the following:

sorting, by the terminal, the plurality of virtual items in response to a third target operation instruction generated by a third target operation;

displaying, in the virtual scene, by the terminal in response to a fourth target operation instruction generated by a fourth target operation, an identifier of a third virtual item selected from the plurality of sorted virtual items, the identifier of the third virtual item being for being selected for use in the virtual scene; and setting, by the terminal in response to a fifth target operation instruction generated by a fifth target operation, frequency at which the identifier of the first virtual item matching the target condition in the plurality of virtual items is displayed in the virtual scene of the client.

15. The terminal according to claim 9, wherein the controlling, by a terminal in response to a first target operation instruction generated by a first target operation, a virtual control object in a virtual scene displayed by a client to acquire a plurality of virtual items comprises: controlling, by the terminal in response to the first target operation instruction generated by the first target operation, virtual attack equipment in a virtual scene displayed by a shooting game client to acquire a plurality of pieces of virtual attack accessory equipment, the virtual attack accessory equipment being configured to increase an attribute value of the virtual attack equipment, the client comprising the shooting game client, the virtual control object comprising the virtual attack equipment, and the virtual item comprising the virtual attack accessory equipment;

the adjusting, by the terminal, the attribute value of the virtual control object according to behavior of the virtual control object in the virtual scene comprises: adjusting, by the terminal, the attribute value of the virtual attack equipment according to behavior of the virtual attack equipment in the virtual scene; and the displaying, by the terminal in the virtual scene of the client, an identifier of a first virtual item matching a target condition in the plurality of virtual items when the adjusted attribute value meets the target condition comprises: displaying, by the terminal in the virtual scene of the shooting game client, an identifier of first virtual attack accessory equipment matching the target condition in the plurality of pieces of virtual attack accessory equipment when the adjusted attribute value meets the target condition.

16. A non-transitory computer-readable storage medium storing instructions, the instructions, when executed by a processor of a terminal, cause the terminal to perform a plurality of operations including:
    controlling, by a terminal in response to a first target operation instruction generated by a user of the terminal, a virtual control object in a virtual scene displayed by a client running at the terminal to acquire a plurality of virtual items, each of the plurality of virtual items being configured to increase an attribute value of the virtual control object;
    adjusting, by the terminal, the attribute value of the virtual control object according to current behavior of the virtual control object in the virtual scene; and
    acquiring, by the terminal, a historical attribute value of the virtual control object in the virtual scene in a past time period and a virtual item used in combination with the virtual control object in the past time period;
    training, by the terminal, a preset model using the historical attribute value and the virtual item used in combination with the historical virtual control object in the past time period, to obtain a trained target model; and
    determining, by the terminal using the trained target model and the current adjusted attribute value of the virtual control object in the virtual scene, that a first virtual item of the plurality of virtual items matches a target condition in the plurality of virtual items when the adjusted attribute value meets the target condition; and
    displaying, by the terminal in the virtual scene of the client, an identifier of the first virtual item, the identifier of the first virtual item being configured for use in the virtual scene.

17. The non-transitory computer-readable storage medium according to claim 16, wherein the displaying, by the terminal in the virtual scene of the client, an identifier of a first virtual item matching a target condition in the plurality of virtual items when the adjusted attribute value meets the target condition comprises:
    displaying, by the terminal in the virtual scene of the client, an identifier of the first virtual item matching a target value interval in the plurality of virtual items when the adjusted attribute value is in the target value interval corresponding to the target condition, different preset value intervals matching different virtual items, the different value intervals comprising the target value interval, and the different virtual items comprising the first virtual item.

18. The non-transitory computer-readable storage medium according to claim 16, wherein the plurality of operations further comprise:
    after displaying, by the terminal in the virtual scene of the client, an identifier of the first virtual item matching the target condition in the plurality of virtual items:
    detecting, by the terminal, an item adjustment instruction on the client by the user of the terminal; and
    adjusting, by the terminal in response to the item adjustment instruction, the identifier of the first virtual item displayed in the virtual scene of the client as an identifier of a second virtual item in the plurality of virtual items, the identifier of the second virtual item being for being selected for use in the virtual scene.

* * * * *